(12) United States Patent
Arifuku

(10) Patent No.: US 11,962,732 B2
(45) Date of Patent: Apr. 16, 2024

(54) IMAGE PROCESSING APPARATUS AND CONTROL METHOD

(71) Applicant: SHARP KABUSHIKI KAISHA, Sakai (JP)

(72) Inventor: Naoya Arifuku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/834,418

(22) Filed: Jun. 7, 2022

(65) Prior Publication Data

US 2022/0407980 A1 Dec. 22, 2022

(30) Foreign Application Priority Data

Jun. 18, 2021 (JP) ................. 2021-102000

(51) Int. Cl.
*H04N 1/32* (2006.01)
*H04N 1/00* (2006.01)

(52) U.S. Cl.
CPC ..... *H04N 1/32085* (2013.01); *H04N 1/00408* (2013.01); *H04N 1/00506* (2013.01)

(58) Field of Classification Search
CPC ........... H04N 1/32085; H04N 1/00408; H04N 1/00506; H04N 1/32; H04N 1/00392; H04N 1/00411; H04N 1/00482; H04N 1/32101; H04N 1/00474; G06F 3/1201
See application file for complete search history.

(56) References Cited

U.S. PATENT DOCUMENTS

| | | | |
|---|---|---|---|
| 9,392,132 B1 * | 7/2016 | Iwasaki | H04N 1/00413 |
| 10,110,759 B2 | 10/2018 | Nishiyama | |
| 2017/0085729 A1 * | 3/2017 | Yoshida | H04N 1/00413 |
| 2020/0014815 A1 * | 1/2020 | Shibao | H04N 1/00204 |
| 2021/0250450 A1 * | 8/2021 | Kawashima | H04L 51/10 |

FOREIGN PATENT DOCUMENTS

| | | |
|---|---|---|
| CN | 103428392 A | 12/2013 |
| JP | 2019-062349 A | 4/2019 |

* cited by examiner

*Primary Examiner* — Iriana Cruz
(74) *Attorney, Agent, or Firm* — ScienBiziP, P.C.

(57) ABSTRACT

An image processing apparatus includes an acquirer that can acquire destination information from an external device, a job executor that executes a transmission job using the acquired destination information, and a controller. The controller controls display of the destination information in accordance with a screen mode of the transmission job, that has accepted a request to acquire the destination information.

7 Claims, 20 Drawing Sheets

FIG. 3

HISTORY INFORMATION

| JOB ID | EXECUTION DATE AND TIME | JOB TYPE | SCREEN MODE | SETTING VALUES |
|---|---|---|---|---|
| 001 | 2020/04/01 09:00 | COPY | SIMPLE | COLOR MODE: FULL COLOR, DOCUMENT: A4, PAPER: A4, MAGNIFICATION: 100, ...... |
| 002 | 2020/04/01 11:00 | E-MAIL TRANSMISSION | NORMAL | TO: aiueo@sample.com, COLOR MODE: FULL COLOR, RESOLUTION: 200x200dpi, FORMAT: PDF, ...... |
| 003 | 2020/04/01 13:10 | FAX TRANSMISSION | NORMAL | TO: 12-3456-7890, IMAGE QUALITY: NORMAL CHARACTERS, DENSITY: DARK, ...... |
| 004 | 2020/04/02 13:30 | E-MAIL TRANSMISSION | SIMPLE | TO: aiueo@sample.com, COLOR MODE: MONOCHROME, RESOLUTION: 200x200dpi, FORMAT: TIFF, ...... |
| 005 | 2020/04/02 13:40 | E-MAIL TRANSMISSION | SIMPLE | TO: aaaaa@sample.com, COLOR MODE: FULL COLOR, RESOLUTION: 400x400dpi, FORMAT: PDF, ...... |
| 006 | 2020/04/02 13:50 | FAX TRANSMISSION | SIMPLE | TO: 22-3333-4444, IMAGE QUALITY: NORMAL CHARACTERS, DENSITY: AUTO, ...... |
| 007 | 2020/04/03 10:00 | IFAX TRANSMISSION | NORMAL | TO: i-sashisu@sample.com, IMAGE QUALITY: NORMAL CHARACTERS, DENSITY: AUTO, ...... |

FIG. 4A

DESTINATION INFORMATION

| ID | DESTINATION NAME | MAIL ADDRESS | FAX NUMBER | PHONE NUMBER | IFAX ADDRESS |
|----|------------------|--------------|------------|--------------|--------------|
| 01 | AI UEO | aiueo@sample.com | 00-1111-2222 | aa-bbbb-cccc | i-aiueo@sample.com |
| 02 | KAKI KUKEKO | kakiku@sample.com | 33-4444-5555 | dd-eeee-ffff | |
| 03 | SASHI SUSESO | sashisu@sample.com | 66-7777-8888 | gg-hhhh-iiii | i-sashisu@sample.com |
| 04 | TACHI TSUTETO | | 99-0000-1111 | jj-kkkk-llll | |
| 05 | NANI NUNENO | nani@sample.com | 22-3333-4444 | mm-oooo-pppp | |

FIG. 4B

```
BEGIN:VCARD
VERSION:3.0
N:AI; UEO;;;
FN:AI, UEO
.
TEL;TYPE=VOICE:aa-bbbb-cccc
TEL;TYPE=FAX:00-1111-2222
EMAIL;TYPE=INTERNET:aiueo@sample.com
EMAIL;TYPE=IFAX:i-aiueo@sample.com
.
END:VCARD
```

FIG. 9

| JOB ID | JOB TYPE | EXECUTION DATE AND TIME | MODE | SETTING VALUES |
|---|---|---|---|---|
| 1 | COPY | 2020/04/01 9:00 | SIMPLE | COLOR MODE: FULL COLOR, DOCUMENT: A4, PAPER: A4, MAGNIFICATION: 100, ...... |
| 2 | E-MAIL TRANSMISSION | 2020/04/01 11:00 | NORMAL | SEND TO: auee@sample.com, COLOR MODE: FULL COLOR, RESOLUTION: 200x200dpi, FORMAT: PDF, ...... |
| 3 | FAX TRANSMISSION | 2020/04/01 13:10 | NORMAL | SEND TO: 12-3456-7890, IMAGE QUALITY: NORMAL CHARACTERS, DENSITY: DARK, ...... |
| 4 | E-MAIL TRANSMISSION | 2020/04/02 13:30 | SIMPLE | SEND TO: auee@sample.com, COLOR MODE: MONOCHROME, RESOLUTION: 200x200dpi, FORMAT: TIFF, ...... |
| 5 | E-MAIL TRANSMISSION | 2020/04/02 13:40 | SIMPLE | SEND TO: aaaaa@sample.com, COLOR MODE: FULL COLOR, RESOLUTION: 400x400dpi, FORMAT: PDF, ...... |
| 6 | FAX TRANSMISSION | 2020/04/02 13:50 | SIMPLE | SEND TO: 22-3333-4444, IMAGE QUALITY: NORMAL CHARACTERS, DENSITY: AUTO, ...... |
| 7 | IFAX TRANSMISSION | 2020/04/03 10:00 | NORMAL | SEND TO: i-aiueo@sample.com, IMAGE QUALITY: NORMAL CHARACTERS, DENSITY: AUTO, ...... |

HISTORY INFORMATION

JOB STATUS

FIG. 12A

| ID | DESTINATION NAME | FAX NUMBER |
|---|---|---|
| ID 01 | AI UEO | 00-1111-2222 |
| ID 02 | KAKI KUKEKO | 33-4444-5555 |
| ID 03 | SASHI SUSESO | 66-7777-8888 |
| ID 04 | TACHI TSUTETO | 99-0000-1111 |
| ID 05 | NANI NUNENO | 22-3333-4444 |

R16 → SIMPLE FAX | SYSTEM INFORMATION | JOB STATUS (W50)

FIG. 12B

| ID | DESTINATION NAME | FAX NUMBER |
|---|---|---|
| ID 01 | AI UEO | 00-1111-2222 |
| ID 02 | KAKI KUKEKO | 33-4444-5555 |
| ID 03 | SASHI SUSESO | 66-7777-8888 |
| ID 04 | TACHI TSUTETO | 99-0000-1111 |
| ID 05 | NANI NUNENO | 22-3333-4444 |

R18 → FAX | SYSTEM INFORMATION | JOB STATUS (W60)
B40 → DISPLAY OTHER DESTINATIONS

FIG. 13

| ID | DESTINATION NAME | FAX NUMBER | MAIL ADDRESS | IFAX ADDRESS |
|---|---|---|---|---|
| ID 01 | AI UEO | 00-1111-2222 | aiueo@sample.com | i-aiueo@sample.com |
| ID 02 | KAKI KUKEKO | 33-4444-5555 | kakiku@sample.com | |
| ID 03 | SASHI SUSESO | 66-7777-8888 | sashisu@sample.com | i-sashisu@sample.com |
| ID 04 | TACHI TSUTETO | 99-0000-1111 | | |
| ID 05 | NANI NUNENO | 22-3333-4444 | nani@sample.com | |

SYSTEM INFORMATION | JOB STATUS

BACK

| ID | DESTINATION NAME | MAIL ADDRESS | IFAX ADDRESS |
|---|---|---|---|
| ID 01 | AI UEO | aiueo@sample.com | i-aiueo@sample.com |
| ID 02 | KAKI KUKEKO | kaki@sample.com | |
| ID 03 | SASHI SUSESO | nashisu@sample.com | i-sashisu@sample.com |
| ID 05 | NANI NUNENO | nani@sample.com | |

(SIMPLE SCAN — R22, W90; SYSTEM INFORMATION, JOB STATUS)

FIG. 15B

| ID | DESTINATION NAME | MAIL ADDRESS | IFAX ADDRESS |
|---|---|---|---|
| ID 01 | AI UEO | aiueo@sample.com | i-aiueo@sample.com |
| ID 02 | KAKI KUKEKO | kaki@sample.com | |
| ID 03 | SASHI SUSESO | nashisu@sample.com | i-sashisu@sample.com |
| ID 05 | NANI NUNENO | nani@sample.com | |

(E-mail — R24, W100; SYSTEM INFORMATION, JOB STATUS; B42: DISPLAY OTHER DESTINATIONS)

FIG. 16

| ID | DESTINATION NAME | MAIL ADDRESS | IFAX ADDRESS | FAX NUMBER |
|---|---|---|---|---|
| ID 01 | AI UEO | aiueo@sample.com | i-aiueo@sample.com | 00-1111-2222 |
| ID 02 | KAKI KUKEKO | kakiku@sample.com | | 33-4444-5555 |
| ID 03 | SASHI SUSESO | sashisu@sample.com | i-sashisu@sample.com | 66-7777-8888 |
| ID 04 | TACHI TSUTETO | | | 99-0000-1111 |
| ID 05 | NANI NUNENO | nani@sample.com | | 22-3333-4444 |

IMAGE PROCESSING APPARATUS AND CONTROL METHOD

BACKGROUND OF THE INVENTION

Field of the Invention

The present disclosure relates to an image processing apparatus or the like.

Description of the Background Art

Image processing apparatuses provided with transmission job functions such as image transmission and fax transmission include ones provided with the function of acquiring destination information such as mail addresses and fax numbers that are managed by an external device such as a smartphone.

The destination information acquired from the external device can be set as the destination for the transmission job executed by the image processing apparatus. The image processing apparatus can utilize the acquired destination information in the same manner as the destination information managed by the image processing apparatus per se.

For example, an image processing apparatus is known, in which after a user selects one of Scan to E-mail function and the Scan to FAX function, the destination of the selected function is set on the basis of the destination information acquired from an external device.

When displaying the destination information acquired from the external device on the image processing apparatus side, the display of the acquired destination information has not been restricted in accordance with the operation mode of the transmission job when the acquisition request is made. For example, when a request to acquire destination information is made via a dedicated screen specialized for fax transmission, the conventional technique displays not only the fax number but also the destination information pertaining to another transmission job, such as a mail address, and thus the user needs to search desired destination information from the destination information displayed in a mixed manner.

The purpose of the present disclosure is to reduce the burden on a user in selecting destination information acquired from an external device and provide a more convenient image processing apparatus or the like.

SUMMARY OF THE INVENTION

In order to solve the above issue, an image processing apparatus according to the present disclosure includes an acquirer that can acquire destination information from an external device, a job executor that executes a transmission job using the acquired destination information, and a controller. The controller controls display of the destination information in accordance with a screen mode of the transmission job, that has accepted a request to acquire the destination information.

Further, a control method according to the present disclosure includes acquiring destination information from an external device, executing a transmission job using the acquired destination information, and controlling. The controlling controls display of the destination information in accordance with a screen mode of the transmission job, that has accepted a request to acquire the destination information.

According to the present disclosure, it is possible to reduce the burden on a user in selecting destination information acquired from an external device and provide a more convenient image processing apparatus or the like.

BRIEF DESCRIPTION OF THE DRAWINGS

FIG. 3 is a table illustrating history information.

FIGS. 4A and 4B are a diagram illustrating destination information.

FIG. 9 is a diagram illustrating an operation example according to the first embodiment.

FIGS. 12A and 12B are a diagram illustrating an operation example according to the first embodiment.

FIG. 13 is a diagram illustrating an operation example according to the first embodiment.

FIGS. 15A and 15B are a diagram illustrating an operation example according to the first embodiment.

FIG. 16 is a diagram illustrating an operation example according to the first embodiment.

DESCRIPTION OF THE PREFERRED EMBODIMENTS

Embodiments of the present disclosure will be described below with reference to the accompanying drawings. In the present disclosure, a multifunction peripheral that executes each function such as fax, image transmission, and copy on a job-by-job basis is described as an embodiment of an image processing apparatus. The following embodiments are examples for explaining the present disclosure, and the technical scope of the description set forth in the claims is not limited to the following description.

1 First Embodiment

The first embodiment is a form of multifunction peripheral capable of, when executing a transmission job such as fax or image transmission, executing the transmission job via a normal setting screen that allows all settings pertaining to the execution of the transmission job or a simple setting screen which is simpler than the normal setting screen. The screen mode for displaying the normal setting screen is referred to as a normal mode, the screen mode for displaying the simple setting screen is referred to as a simple mode, and the screen mode for displaying a home screen is referred to as a basic mode. The image transmission (job) according to the present disclosure will be described as including an e-mail transmission (job) and/or an IFAX transmission (job).

1.1 Functional Configuration

Figure 1:
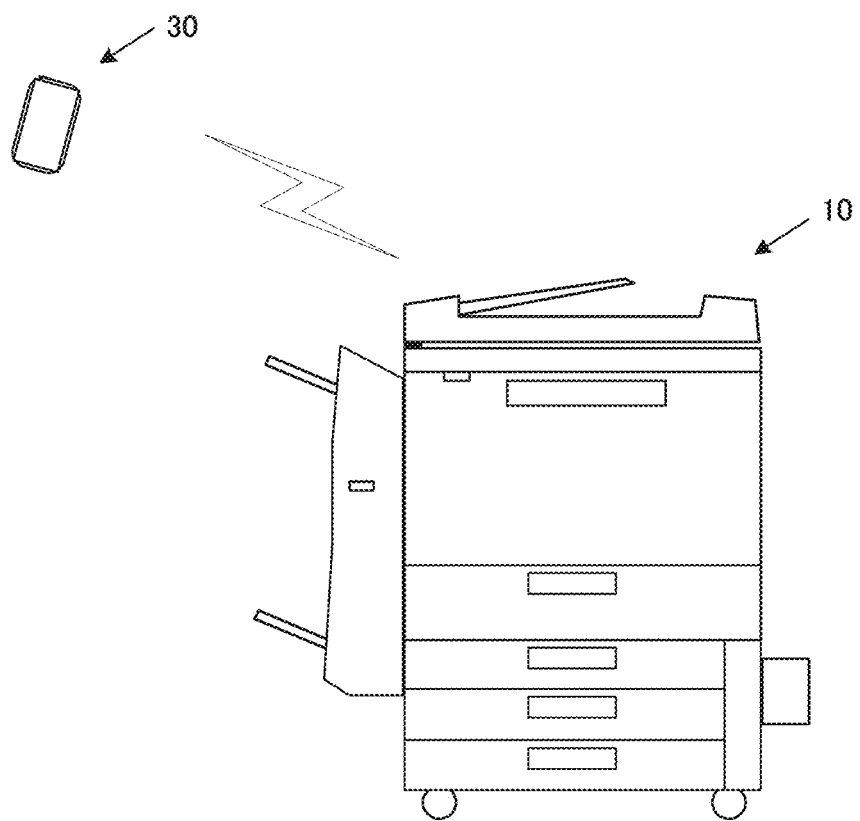
FIG. 1 is a diagram schematically illustrating an overall configuration according to a first embodiment.

FIG. 1 is a diagram schematically illustrating an overall configuration according to a first embodiment. A multifunction peripheral 10 is configured in such a manner that it connects to a terminal device 30 as an external device, and transmission and reception of information can be carried out mutually.

Here, the method for connecting to the terminal device 30 is not limited, but for example, a (short-range) wireless communication technology such as Bluetooth (registered trademark), near field communication (NFC), Wi-fi (registered trademark), ZigBee (registered trademark), IrDA, and wireless USB can be employed. In FIG. 1, an example in which the multifunction peripheral 10 is directly connected to the terminal device 30 by wireless communication, but it is also possible to connect via a network (not illustrated), such as a local area network (LAN), a wide area network (WAN), or the Internet.

Further, the number of terminal devices 30 that can be connected to the multifunction peripheral 10 is not particularly limited. The terminal device 30 may have the same or different functional configurations.

1.1.1 Multifunction Peripheral 10

Figure 2:
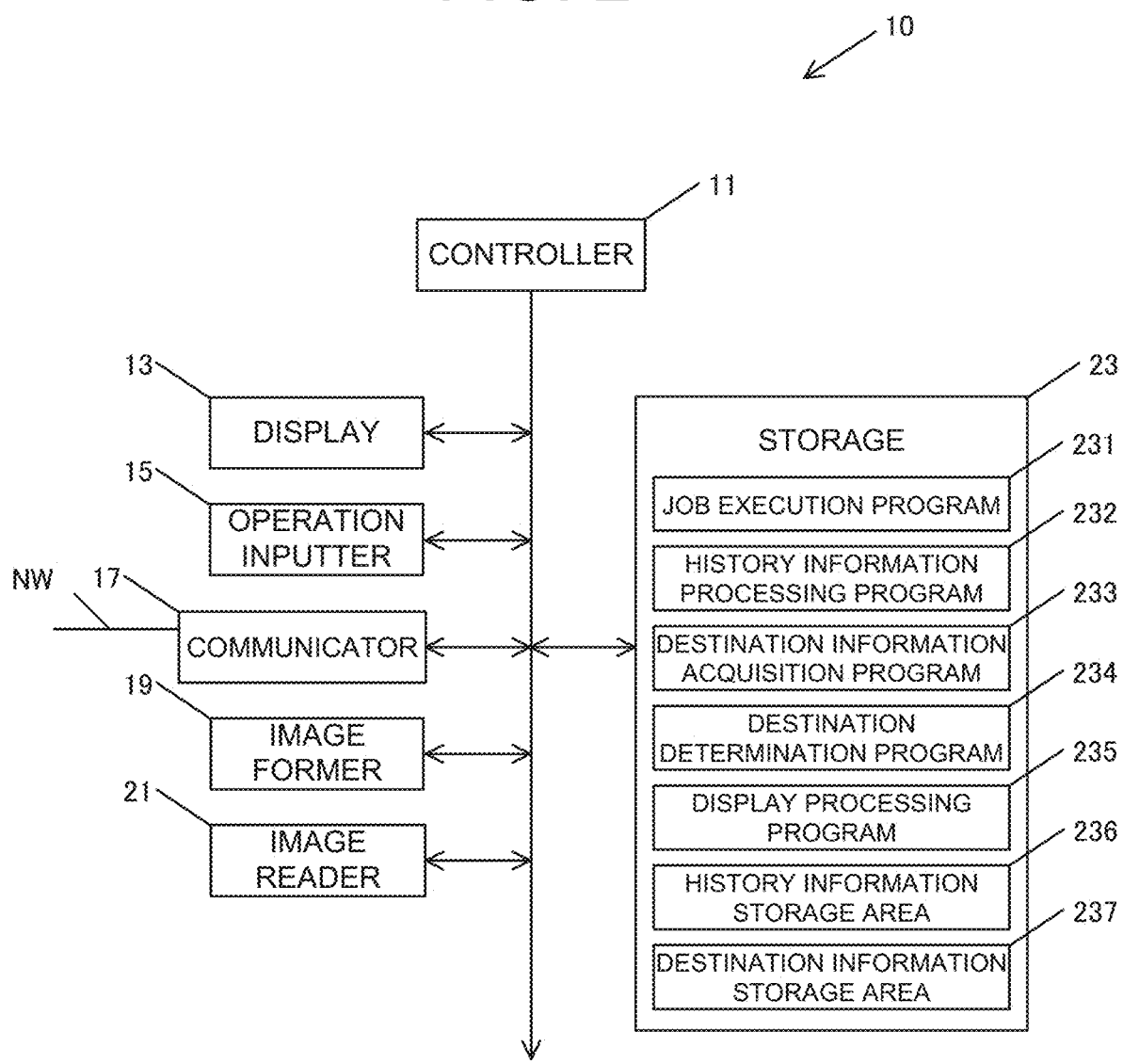
FIG. 2 is a diagram illustrating a functional configuration of a multifunction peripheral according to the first embodiment.

FIG. 2 is a functional configuration diagram of the multifunction peripheral 10. The multifunction peripheral 10 includes a controller 11, a display 13, an operation inputter 15, a communicator 17, an image former 19, an image reader 21, and a storage 23.

The controller 11 controls the entire multifunction peripheral 10. The controller 11 is configured from, for example, one or more arithmetic devices (such as central processing units (CPUs)). The controller 11 reads and executes various programs stored in the storage 23, thereby implementing the function.

The display 13 displays various types of information to a user or the like. The display 13 can be composed of, for example, a liquid crystal display (LCD) or an organic electro-luminescence (EL) display.

The operation inputter 15 accepts input information entered by the user or the like. The operation inputter 15 can be composed of hardware keys (for example, a numeric keypad), buttons, or the like. The operation inputter 15 can be configured as a touch panel that allows input via the display 13. In this case, as an input method for the touch panel, a method such as a resistive film method, an infrared method, an electromagnetic induction method, or a capacitive sensing method may be employed.

As described above, the communicator 17 includes a wireless communication interface such as Bluetooth, NFC, Wi-fi, Zigbee, IrDA, and wireless USB. Further, the communicator 17 can also be provided with either of or both of wired/wireless interfaces to communicate with other devices via a network (not illustrated), such as a LAN, a WAN, the Internet, a telephone line, and a fax line.

The image former 19 forms an image based on image data, on a paper as a recording medium. The image former 19 feeds a paper from a paper feeder (not illustrated), forms an image based on the image data on the paper, and then discharges the paper to a paper discharger (not illustrated). The image former 19 can be configured from, for example, a laser printer using an electrophotographic method. The image former 19 performs image formation with the use of toners supplied from toner cartridges (not illustrated), corresponding to toner colors (e.g., cyan, magenta, yellow, and black).

The image reader 21 generates image data by scanning and reading a document image to be read. The image reader 21 may be configured as a scanner device provided with an image sensor such as a charge coupled device (CCD) and a contact image sensor (CIS). The configuration of the image reader 21 is not particularly limited as long as the image reader 21 is configured to read a reflected light image from a document image by the image sensor, thereby generating image data.

The storage 23 stores various programs and data necessary for the operation of the multifunction peripheral 10. The storage 23 may be composed of a storage device including, for example, a random access memory (RAM), a hard disk drive (HDD), a solid state drive (SSD), a read only memory (ROM), or the like.

In the first embodiment, the storage 23 stores a job execution program 231, a history information processing program 232, a destination information acquisition program 233, a destination determination program 234, and a display processing program 235, and secures a history information storage area 236 and a destination information storage area 237.

The job execution program 231 is a program read by the controller 11 in order to execute each function such as fax, image transmission, and copy. The controller 11 that has read the job execution program executes a job by controlling a job executor involved in job execution, such as the display 13, operation inputter 15, communicator 17, image former 19, and image reader 21. Further, the controller 11 that has read the job execution program 231 can execute various jobs on the basis of setting values stored as history information, which will be described below.

The history information processing program 232 is a program read by the controller 11 when performing, for example, acquisition of a setting value related to execution of a job, generation of history information, and various kinds of processing on the history information. The controller 11 that has read the history information processing program 232 generates history information on the basis of the acquired setting value. Then, the controller 11 stores the generated history information in the history information storage area 236.

The destination information acquisition program 233 is a program read by the controller 11 when a request to acquire destination information is received from the user. The controller 11 that has read the destination information acquisition program 233 functions as an acquirer, and requests the terminal device 30 to output destination information including a destination such as a mail address, a fax number, a phone number, and an IFAX address managed by the terminal device 30. The acquirer of the destination information is not particularly limited. For example, a telephone directory transfer profile such as a Phone Book Access Profile (PBAP) or an Object Push Profile (OPP) may be used.

The destination determination program 234 is a program read by the controller 11 when determining a destination type corresponding to a job type on the basis of the destination information acquired from the terminal device 30, and classifying destinations. The controller 11 that has read the destination determination program 234 refers to the acquired destination information and determines the destination type of the destinations included in the destination information. The controller 11 classifies the destinations on the basis of the determined destination type. The determination of the destination type will be described below.

The display processing program 235 is a program read by the controller 11 when displaying, on the display 13, the normal setting screen, simple setting screen, history information display screen, home screen as a basic screen, or the like in accordance with the screen mode. The controller 11 that has read the display processing program 235 displays, on the display 13, various screens such as the normal setting screen on the basis of frame information, content placement information (not illustrated), and the like.

The history information storage area 236 is a storage area for storing the history information in the form of, for example, a data table. The history information according to the present disclosure can be configured as, for example, history information in which an identifier such as a job ID for uniquely identifying information is attached to the information including a combination of information related to job execution history such as execution date and time, job type, and operation mode, and part or all of the setting values pertaining to job execution. The history information stored in the history information storage area 236 is read out by the controller 11 as appropriate and used to create a history information display screen or execute a new job using the history information.

FIG. 3 is a table illustrating an example of a data structure of the history information stored in the history information storage area 236. For example, the history information for job ID "001" represents a job whose job type is "copy", and which was executed in the simple mode on the execution date and time of "2020/04/01 9:00". The setting values include, for example, a setting value related to image formation, such as color mode, document/paper size, density, image quality, resolution, magnification, or data format. The history information of the job ID "001" includes setting values such as color mode: full color, document size: A4, paper size: A4, and magnification: 100%. Note that the setting values illustrated in FIG. 3 are merely examples, and the setting values in the present disclosure are not limited to the matters denoted by FIG. 3 alone.

The history information of job ID "002" represents a job whose job type is "e-mail transmission", and which was executed in the normal mode on the execution date and time of "2020/04/01 11:00". The history information of the job ID "002" includes a mail address "aiueo@sample.com" as the destination in addition to the setting values such as color mode: full color, resolution: 200×200 dpi, and format: PDF.

The history information of job ID "003" represents a job whose job type is "fax transmission", and which was executed in the normal mode on the execution date and time of "2020/04/01 13:10". The history information of the job ID "003" includes a fax number "12-3456-7890" as the destination in addition to the setting values such as image quality: normal characters and density: dark.

The history information of job ID "004" represents a job whose job type is "e-mail transmission", and which was executed in the simple mode on the execution date and time of "2020/04/02 13:30". The history information of the job ID "004" includes a mail address "aiueo@sample.com" as the destination in addition to the setting values such as color mode: monochrome, resolution: 200×200 dpi, and format: TIFF.

The history information of job ID "005" represents a job whose job type is "e-mail transmission", and which was executed in the simple mode on the execution date and time of "2020/04/02 13:40". The history information of the job ID "005" includes a mail address "aaaaa@sample.com" as the destination in addition to the setting values such as color mode: full color, resolution: 400×400 dpi, and format: PDF.

The history information of job ID "006" represents a job whose job type is "fax transmission", and which was executed in the simple mode on the execution date and time of "2020/04/02 13:50". The history information of the job ID "006" includes "22-3333-4444" as the destination in addition to the setting values such as image quality: normal characters, and density: auto.

The history information of job ID "007" represents a job whose job type is "IFAX transmission", and which was executed in the normal mode on the execution date and time of "2020/04/03 10:00". The history information of the job ID "007" includes an IFAX address "i-sashisu@sample.com" as the destination in addition to the setting values such as image quality: normal characters, and density: auto.

The destination information storage area 237 is a storage area for storing the destination information acquired from the terminal device 30 in the form of, for example, a data table. The destination information stored in the destination information storage area 237 is read out by the controller 11 as appropriate and used for destination display processing according to the operation mode of the transmission job.

Here, FIG. 4A is a diagram illustrating an example of a data structure of the destination information stored in the destination information storage area 237. For example, the destination information pertaining to ID "01" is an example in which the destination name is "Ai Ueo", and the mail address: aiueo@sample.com, the fax number: 00-1111-2222, the phone number: aa-bbbb-cccc, and the IFAX address: i-aiueo@sample.com are stored in accordance with the destination type. The destination information illustrated in FIG. 4A is merely an example, and destination information according to the present disclosure is not limited to the description in FIG. 4A.

The destination information pertaining to ID "02" is an example in which the destination name is "Kaki Kukeko", and the mail address: kakiku@sample.com, the fax number: 33-4444-5555, and the phone number: dd-eeee-ffff are stored in accordance with the destination type.

The destination information pertaining to ID "03" is an example in which the destination name is "Sashi Suseso", and the mail address: sashisu@sample.com, the fax number: 66-7777-8888, the phone number: gg-hhhh-iiii, and the IFAX address: i-sashisu@sample.com are stored in accordance with the destination type.

The destination information pertaining to ID "04" is an example in which the destination name is "Tachi Tsuteto", and the fax number: 99-0000-1111, and the phone number: jj-kkkk-llll are stored in accordance with the destination type.

The destination information pertaining to ID "05" is an example in which the destination name is "Nani Nuneno", and the mail address: nani@sample.com, the fax number: 22-3333-4444, and the phone number: mm-oooo-pppp are stored in accordance with the destination type.

It is preferable that the destination information stored in the destination information storage area 237 be deleted after the execution of a job using the destination information from the perspective of preventing leakage of the destination information to a third party.

1.1.2 Terminal Device 30

Figure 5:
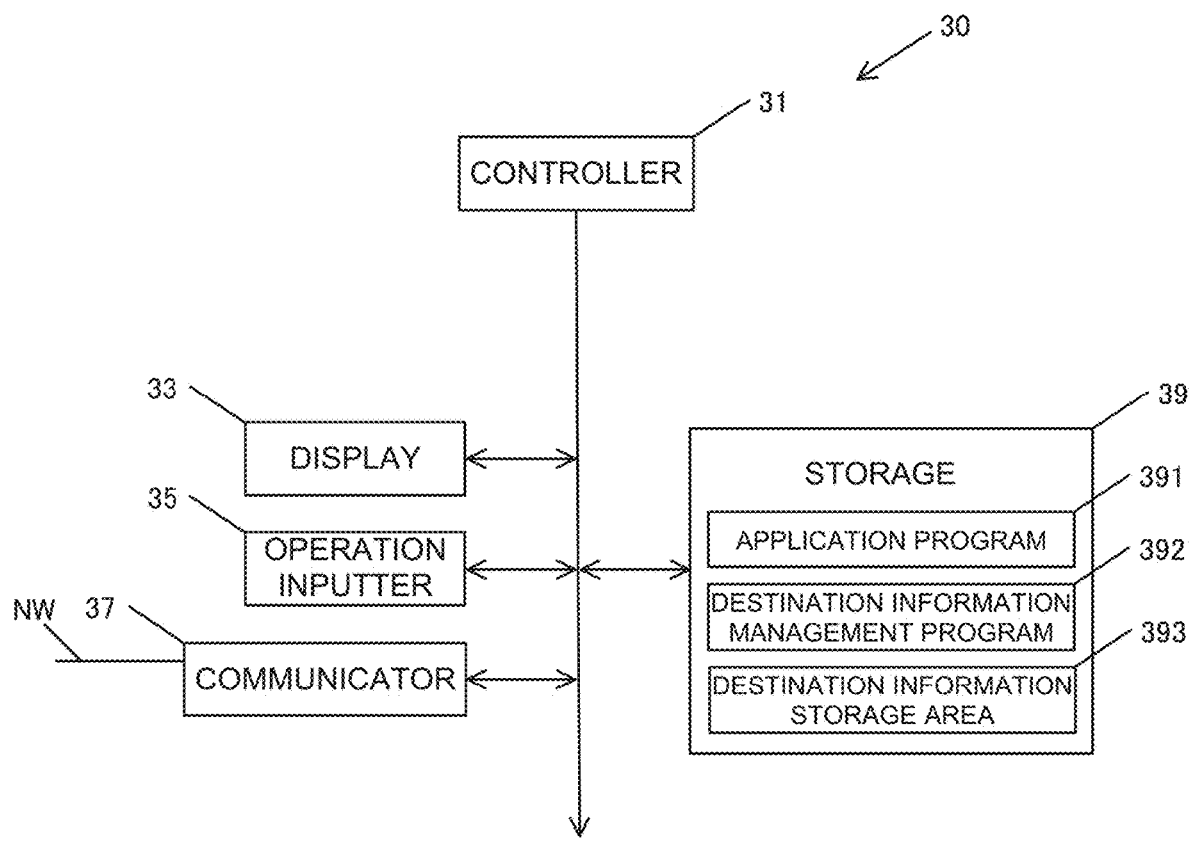
FIG. 5 is a diagram illustrating a functional configuration of a terminal device according to the first embodiment.

FIG. 5 is a diagram illustrating a functional configuration of the terminal device 30. The terminal device 30 according to the present disclosure is assumed to be a so-called mobile terminal device including, but not limited to, a smartphone, a tablet, a cell phone, a laptop, or the like. The terminal device 30 according to the present disclosure can include a stationary terminal device such as a desktop computer if such a terminal device has a configuration in which communication with the multifunction peripheral 10 is enabled.

The terminal device 30 as described above includes a controller 31, a display 33, an operation inputter 35, a communicator 37, and a storage 39.

The controller 31 controls the entire terminal device 30. The controller 31 is composed of, for example, one or more arithmetic devices (such as a CPU). The controller 31 implements its functions by reading and executing various programs stored in the storage 39.

The display 33 displays various information to the user. The display 33 can be composed of, for example, an LCD or an organic EL display.

The operation inputter 35 accepts input of information by the user or the like. The operation inputter 35 can be configured as a touch panel that allows input via the display 33. In that case, the input on the touch panel may be detected using a resistive film, an infrared light, electromagnetic induction, capacitance, or the like.

The communicator 37 includes a communication interface such as Bluetooth, NFC, Wi-fi, ZigBee, IrDA, and wireless USB. Further, the communicator 37 can also be provided with either of or both of wired/wireless interfaces to communicate with other devices via a network (not illustrated), such as a LAN, a WAN, the Internet, a telephone line, and a fax line.

The storage 39 stores various programs and data necessary for the operation of the terminal device 30. The storage 39 include storages such as a RAM, an HDD, an SSD, and a ROM.

In the first embodiment, the storage 39 stores an application program 391 and a destination information management program 392, and secures a destination information storage area 393.

The application program 391 is a program read by the controller 31 when executing various applications such as, for example, e-mail, fax, call, SNS, video and music viewing, and game.

The destination information management program 392 is a program read by the controller 31 when managing destination information such as a mail address, a fax number, a phone number, and an IFAX address of a recipient, which is used in an application such as e-mail, fax, and call. The controller 31 performs processing related to the destination information, such as new registration, editing, and deletion of the destination information on the basis of an instruction from the user. Further, the controller 31 reads and outputs the managed destination information in response to a request to acquire the destination information from the multifunction peripheral 10. When the request to acquire the destination information is made on the basis of, for example, a telephone directory transfer profile such as PBAP or OPP, the controller 31 can output the destination information in a vCard format as illustrated in FIG. 4B. The destination information can also be exported in a comma separated value (CSV) format. The destination information management program 392 may be implemented as a management program incorporated in the application program 391.

The destination information storage area 393 is a storage area for storing destination information in which identification information such as a user name and an ID is associated with a destination such as a mail address, a fax number, a phone number, and an IFAX address.

1.2 Flow of Processing

Figure 6:
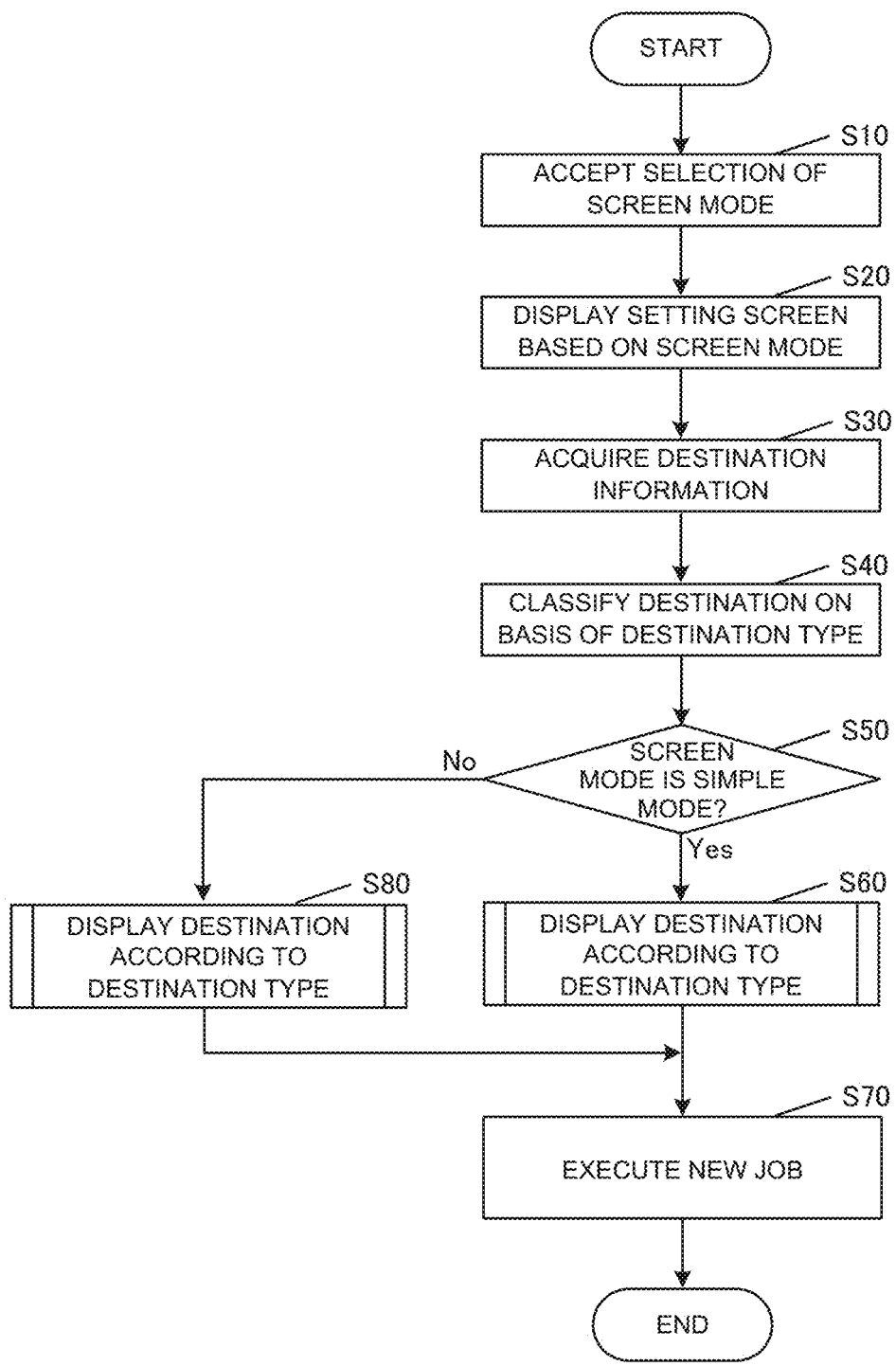
FIG. 6 is a flowchart illustrating a flow of processing according to the first embodiment.

Next, a flow of processing according to the first embodiment will be described. FIG. 6 is a flowchart illustrating the display control of the destination according to the screen mode of the transmission job when making a request to acquire destination information.

The controller 11 accepts a selection of the screen mode by the user (step S10). The user can, for example, select the history information of jobs executed under each screen mode or can select the normal or simple mode for job execution via the home screen in the basic mode.

Next, the controller 11 displays, on the display 13, a setting screen based on the screen mode selected by the user (step S20). In this case, the controller 11 displays, on the display 13, either the normal setting screen corresponding to the normal mode selected or the simple setting screen corresponding to the simple mode selected by the user.

In response to a press of the destination information acquisition button provided on each of the normal or simple setting screen, the controller 11 reads the destination information acquisition program 233. The controller 11 that has read the destination information acquisition program 233 requests the terminal device 30 to output the destination information.

The controller 31 of the terminal device 30 reads the destination information management program 392 in response to the request to acquire destination information from the multifunction peripheral 10, thereby outputting the destination information to be managed.

When the destination information is output from the terminal device 30, the controller 11 acquires the destination information (step S30).

When acquiring the destination information from the terminal device 30, the controller 11 reads the destination determination program 234, thereby determining the destination type and classifying the destination (step S40). Here, the determination of the destination type by the controller 11 will be described using FIG. 4B.

FIG. 4B is an output form of the destination information pertaining to the destination name "Ai Ueo" illustrated in FIG. 4A. The controller 11 refers to the item values of "TEL" and "EMAIL" in the acquired vCard format destination information, thereby determining the destination type. For example, "TYPE=VOICE: aa-bbbb-cccc" of "TEL" represents the destination information based on voice communication. In this case, the controller 11 determines the destination type as "telephone" and classifies the destination (aa-bbbb-cccc) as a phone number. Similarly, "TYPE=FAX: 00-1111-2222" of "TEL" represents the destination information based on fax communication. In this case, the controller 11 determines the destination type as "fax" and classifies the destination (00-1111-2222) as a fax number. Meanwhile, "TYPE=INTERNET: aiueo@sample.com" of "EMAIL" represents the destination information based on e-mail communication. In this case, the controller 11 determines the destination type as "e-mail" and classifies the destination (aiueo@sample.com) as a mail address. Further, "TYPE=IFAX: i-aiueo@sample.com" of "EMAIL" represents the destination information based on IFAX communication. In this case, the controller 11 determines the destination type as "IFAX" and classifies the destination (i-aiueo@sample.com) as an IFAX address.

Next, the controller 11 checks whether the screen mode selected by the user is the simple mode (step S50).

If the screen mode selected by the user is the simple mode, the controller 11 displays the destination according to the destination type on the display 13 (if Yes in step S50, then step S60).

Then, the controller 11 executes a new job using the destination selected by the user and terminates the processing (step S70). In a case where the destination information stored in the destination information storage area 237 is deleted after the job is executed, a step for deleting the destination information may be provided after the completion of step S70.

On the other hand, if the screen mode selected by the user is the normal mode, the controller 11 displays the destination according to the destination type on the display 13 (if No in step S50, then step S80).

Then, the controller 11 executes a new job using the destination of another destination type selected by the user and terminates the processing (step S70).

Figure 7:
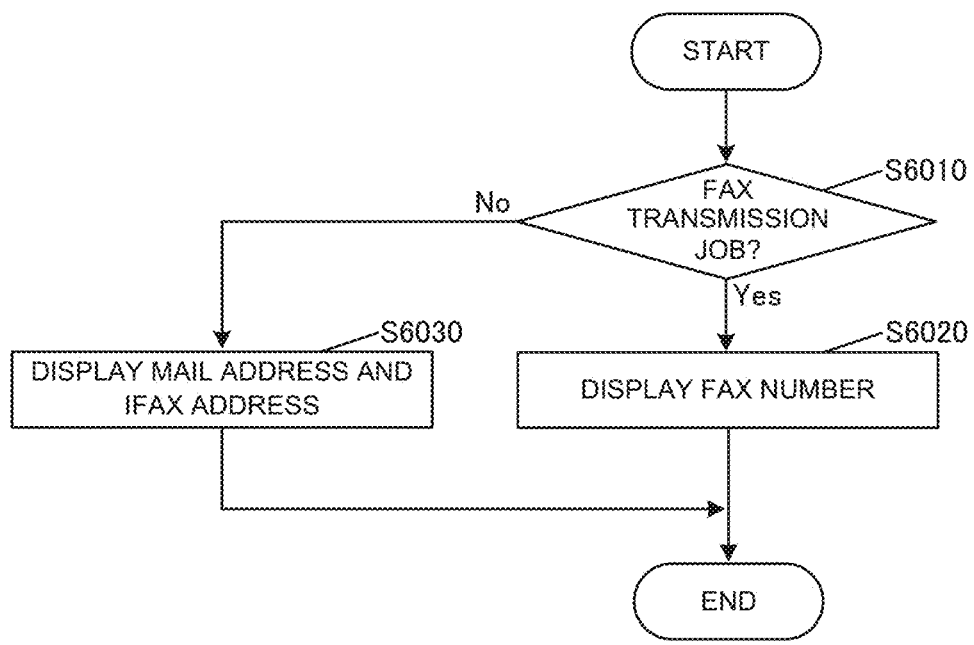
FIG. 7 is a flowchart illustrating a flow of processing according to the first embodiment.

Next, the display control of the destination according to the destination type pertaining to step S60 of FIG. 6 will be described using the flowchart in FIG. 7.

The controller 11 determines whether the transmission job pertaining to the screen mode selected by the user is a fax transmission job (step S6010).

If the transmission job is a fax transmission job, the controller 11 displays only the fax number on the display 13 (if Yes in step S6010, then step S6020).

On the other hand, if the transmission job is not a fax transmission job, the controller 11 displays only the mail address and IFAX address on the display 13 (if No in step S6010, then step S6030).

Figure 8:
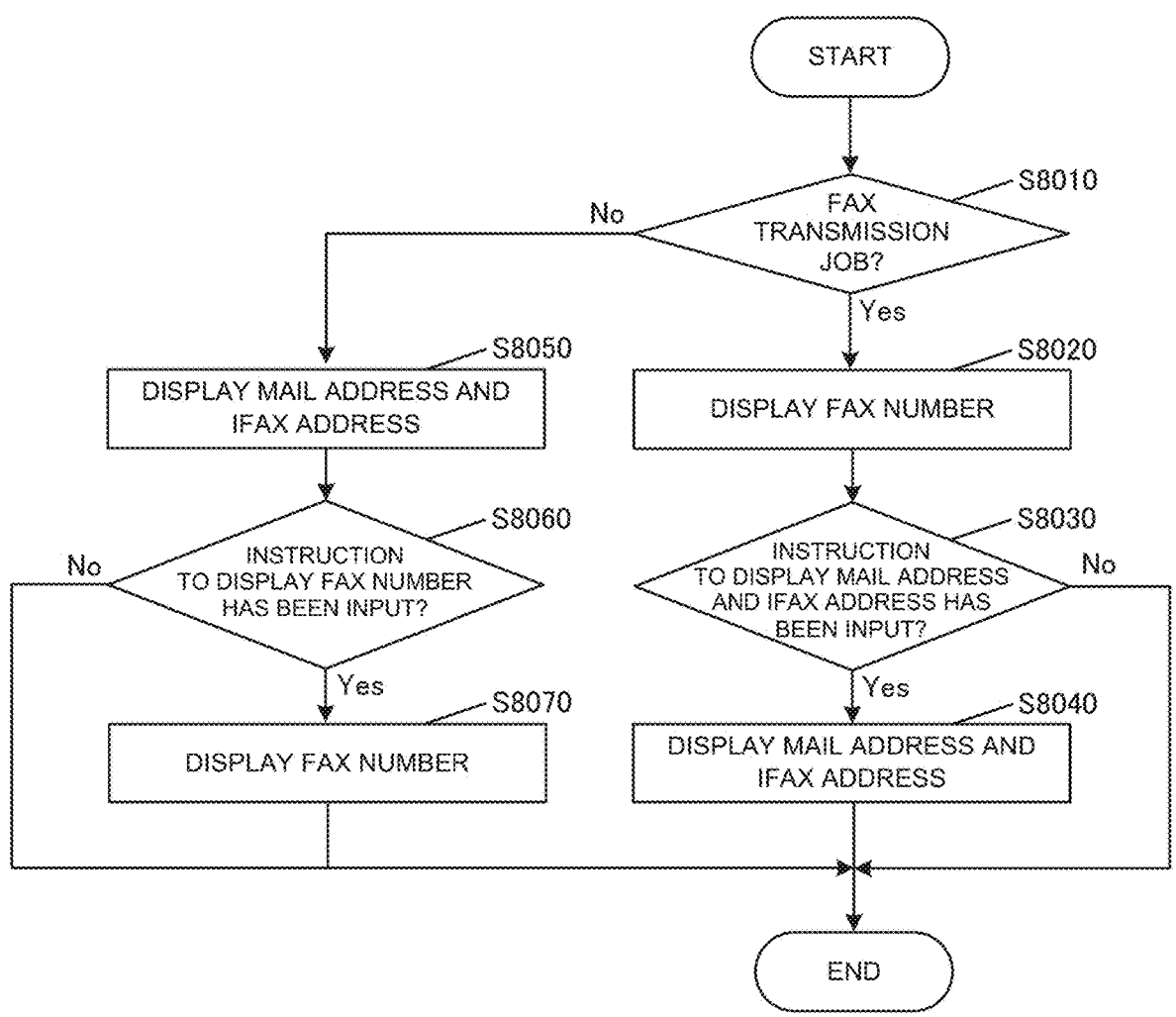
FIG. 8 is a flowchart illustrating a flow of processing according to the first embodiment.

Next, the display control of the destination according to the destination type pertaining to step S80 of FIG. 6 will be described using the flowchart in FIG. 8.

First, the controller 11 determines whether the transmission job pertaining to the screen mode selected by the user is a fax transmission job (step S8010).

If the transmission job is a fax transmission job, the controller 11 displays only the fax number on the display 13 (if Yes in step S8010, then step S8020).

Next, the controller 11 determines whether the user has input the instruction to display the mail address and IFAX address as the destination of another destination type (step S8030).

If the user has input the instruction to display the mail address and IFAX address as the destination of another destination type, the controller 11 displays the mail address and IFAX address on the display 13 (if Yes in step S8030, then step S8040). On the other hand, if the user has not input the instruction to display the mail address and IFAX address as the destination of another destination type, the controller 11 terminates the processing with the fax number displayed (No in step S8030).

On the other hand, if the transmission job is not a fax transmission job, the controller 11 displays only the mail address and IFAX address on the display 13 (if No in step S8010, then step S8050).

Next, the controller 11 determines whether the user has input the instruction to display the fax number as the destination of another destination type (step S8060).

If the user has input the instruction to display the fax number as the destination of another destination type, the controller 11 displays the fax number on the display 13 (if Yes in step S8060, then step S8070). On the other hand, if the user has not input the instruction to display the fax number as the destination of another destination type, the controller 11 terminates the processing with the mail address and IFAX address displayed (No in step S8060).

1.3 Operation Example

Next, an operation example according to the first embodiment will be described. First, an example of operation pertaining to the user's selection of a screen mode (corresponding to step S10 of FIG. 6) is described. Examples of this operation include selection of the history information of jobs executed under each screen mode or selection of the screen mode via the home screen.

FIG. 9 is a configuration example of a history information display screen W10 that displays job history information. The history information display screen W10 is a screen that accepts the user's selection of history information when executing a job that is the same as or similar to the job from the job history information. In the present disclosure, the touch panel type operation inputter 15 provided on the screen of the display 13 detects the user's presses on each button area divided on the screen, and enables each input by the user.

The history information display screen W10 includes a history information display area R10 and a job status report button B10. The history information display area R10 can display the history of jobs executed under either of the screen modes, the normal mode or simple mode, as history information. FIG. 9 is a display example in which the history information illustrated in FIG. 3 is displayed so as to be selected by the user.

Here, for example, when history information A10 pertaining to job ID "006" is selected by the user, the controller 11 displays a simple setting screen that reflects the contents of the setting values included in the history information. In other words, the user refers to the "normal" or "simple" displayed in the mode item of the history information display screen W10, and selects the history information according to the mode item, and thereby can select either of the screen modes, the normal mode or the simple mode.

The job status report button B10 is a button that accepts input of an instruction to display a job execution status. In response to a press of the job status report button B10, the controller 11 displays the job execution status via a display screen (not illustrated).

Figure 10:
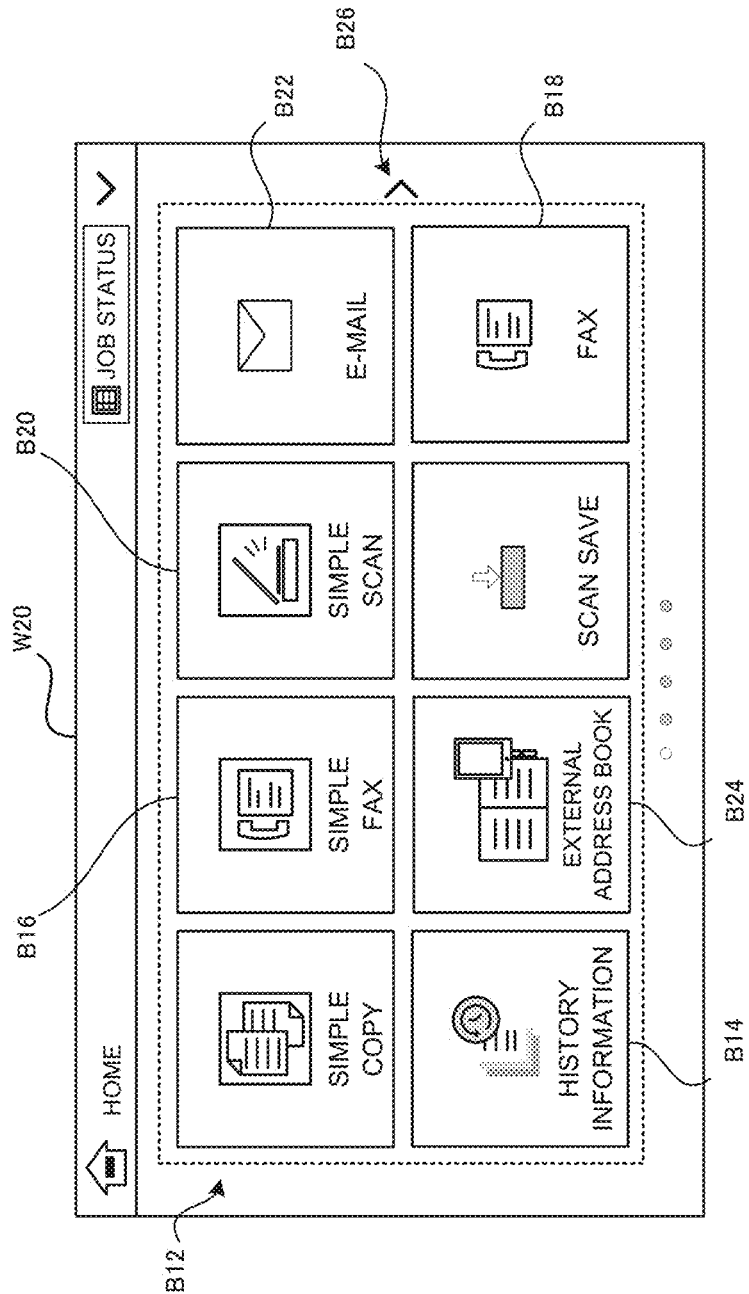
FIG. 10 is a diagram illustrating an operation example according to the first embodiment.

FIG. 10 illustrates an example of screen mode selection via a home screen W20. The home screen W20 functions as a basic screen that is displayed on the display 13 in cases like when the power is turned on, in standby mode, when recovering from sleep mode, and the like, and accepts operation input from the user. The home screen W20 includes job/processing selection buttons B12, a display switching button B26.

The job/processing selection buttons B12 accept the user's desired selection of job types and various kinds of processing. For example, the user can also display the history information display screen illustrated in FIG. 9 by pressing the "history information" button B14 included in the job/processing selection buttons B12.

Further, the user can also execute a fax transmission job under the simple mode by pressing the "simple fax" button B16. In response to a press of the "simple fax" button B16, the controller 11 displays the simple setting screen pertaining to the fax transmission job. Similarly, the user can also execute a fax transmission job under the normal mode by pressing the "fax" button B18. In response to a press of the "fax" button B18, the controller 11 displays the normal setting screen pertaining to the fax transmission job.

Further, the user can execute an image transmission job (e-mail transmission job or IFAX transmission job) under the simple mode by pressing the "simple scan" button B20. In response to a press of the "simple scan" button B20, the controller 11 displays the simple setting screen pertaining to the image transmission job. Similarly, the user can also execute an e-mail transmission job under the normal mode by pressing the "e-mail" button B22. In response to a press of the "e-mail" button B22, the controller 11 displays the normal setting screen pertaining to the e-mail transmission job.

FIG. 10 is an example in which eight types of job/processing selection buttons, a "simple copy" button, the "simple fax" button B16, the "simple scan" button B20, the "e-mail" button B22, the "history information" button B14, an "external address book" button B24, a "save scan" button, and the "fax" button B18 are displayed as job/processing selection buttons constituting the job/processing selection buttons B12. For example, other job/processing buttons such as the IFAX button that accepts the execution of an IFAX transmission job under the normal mode can be displayed by pressing the display switching button B26. The configuration example of the job/processing selection buttons B12 illustrated in FIG. 10 is merely an example, and is not limited to the description in FIG. 10.

Figure 11A:
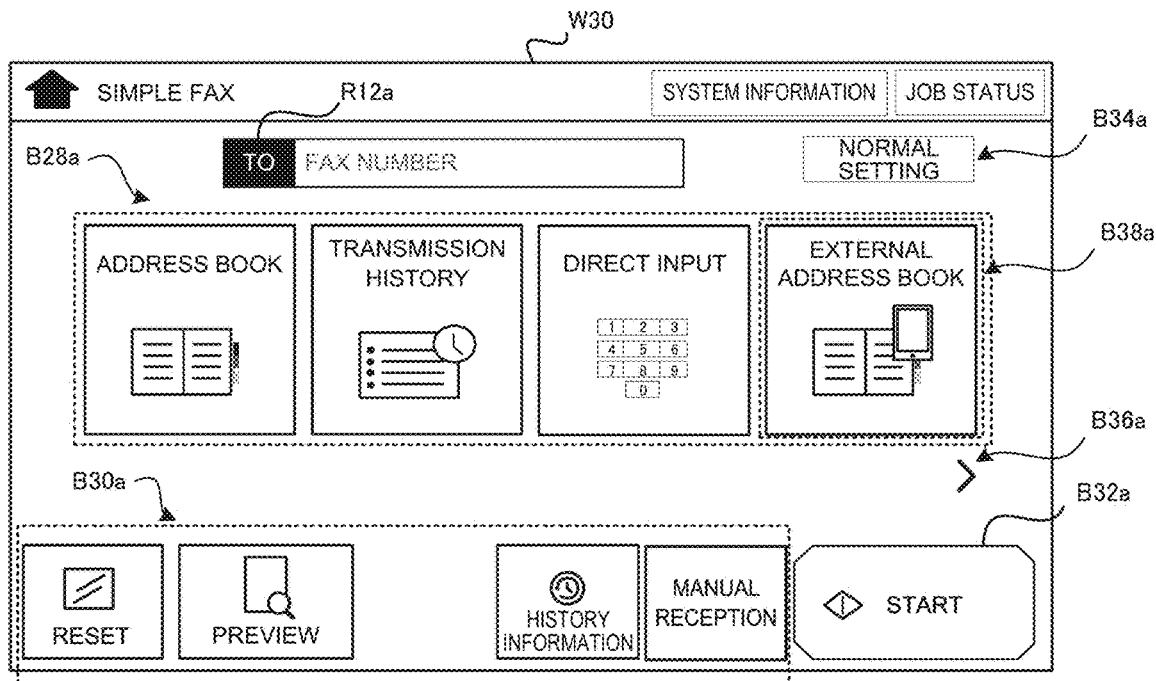
FIGS. 11A and 11B are a diagram illustrating an operation example according to the first embodiment.
Figure 11B:
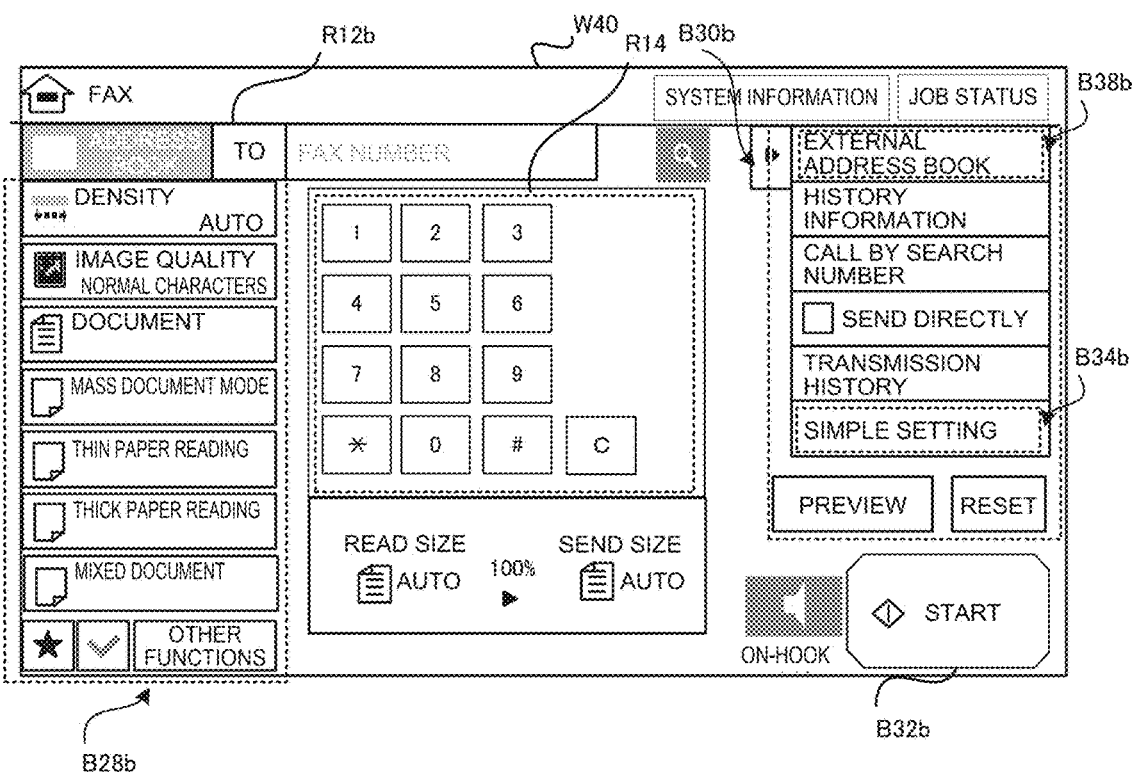

FIG. 11A is a configuration example of a simple setting screen W30 pertaining to the fax transmission job. FIG. 11B is a configuration example of a normal setting screen W40 pertaining to the fax transmission job. The simple setting screen W30 can be displayed via the mode selection processing by the user via the history information display screen W10 of FIG. 9 and the home screen W20 of FIG. 10 and the normal setting screen W40. The normal setting screen W40 can be displayed via, for example, the mode selection processing by the user via the history information display screen W10 of FIG. 9 and the home screen W20 of FIG. 10 and the simple setting screen W30. This operation example corresponds to the processing at step S20 of FIG. 6.

Compared to the normal setting screen W40, the simple setting screen W30 has a limited number of setting value items that can be set by the user, and the screen structure is simpler than that of the normal setting screen W40. The simple setting screen W30 includes setting value buttons B28a, operation control buttons B30a, a start button B32a, a normal setting button B34a, a display switching button B36a, and a destination display area R12a.

The setting value buttons B28a accept selection/input of setting values that can be set by the user and selection of various kinds of processing via the simple setting screen W30. For example, the user can press the address book button and set the destination of fax transmission as a setting value from the displayed address book (not illustrated). FIG. 11A is an example in which four types of items, the "address book" button, the "transmission history" button, the "direct input" button, and the "external address book" button B38a, are displayed as the setting value buttons B28a. The other setting value buttons B28a can be displayed by pressing the display switching button B36a.

The user presses the "external address book" button B38a to acquire the destination information from the terminal device 30. In response to a press of the "external address book" button B38a, the controller 11 reads the destination information acquisition program 233 and acquires the destination information from the terminal device 30.

Operation control buttons B30a include, for example, a reset button, a preview button, a history information display button, and a manual reception button. For example, the reset button accepts a reset of the setting value selected and input via the setting value buttons B28a or the like. The preview button accepts an instruction to display a preview image prior to executing a fax transmission job. The history information display button accepts an instruction to display the history information display screen W10 illustrated in FIG. 9. The manual reception button accepts input of manual reception of a fax by the user.

The start button B32a accepts input of an instruction to execute a fax transmission job. When the start button B32a is pressed, the controller 11 executes the processing pertaining to the fax transmission job.

The normal setting button B34a accepts an instruction to switch display to the normal setting screen W40.

The destination display area R12a is a display area for displaying the destination of the fax transmission selected/input via any of the "address book" button, "transmission history" button, "direct input" button, or "external address book" button B38a of the setting value buttons B28a.

The normal setting screen W40 illustrated in FIG. 11B has a screen structure that allows all settings pertaining to the execution of a fax transmission job. The normal setting screen W40 includes setting value buttons B28b, operation control buttons B30b, a start button B32b, and a destination display area R12b. The setting value buttons B28b accept selection/input of setting values that can be set by the user and selection of various settings via the normal setting screen W40. The user can, for example, press the density button and select a desired setting value from items such as "dark", "normal", "light", and "automatic" (not illustrated) pertaining to density selection, thereby setting the setting value pertaining to the density. FIG. 11B is an example in which seven types of setting value items of "density", "image quality", "document", "mass document mode", "thin paper reading", "thick paper reading", and "mixed document" are provided as settable setting value items. For each setting value indicated on the surface of the setting value buttons B28b, the setting value of the applied history information is reflected and displayed (FIG. 11B is an example in which the setting value pertaining to the history information of the job ID "006" in FIG. 3 has been applied). The configuration of the setting value buttons B28b illustrated in FIG. 11B is merely an example, and is not limited to the description in FIG. 11B.

In addition to the above setting value items, the setting value buttons B28b are provided with an "other functions" button. By pressing the "other functions" button, the user can call up setting value items other than those displayed and select/input a setting value.

In addition to the preview and reset buttons, the operation control buttons B30b include, for example, an advanced function button such as an "external address book" button B38b, a "history information" button, and a "call by search number" button. The user presses the "external address book" button B38b to acquire the destination information from the terminal device 30. In response to a press of the "external address book" button B38b, the controller 11 reads the destination information acquisition program 233 and acquires the destination information from the terminal device 30.

Further, the operation control buttons B30b include a simple setting button B34b. The simple setting button B34b accepts an instruction to switch display to the simple setting screen W30.

The start button B32b accepts input of an instruction to execute a fax transmission job. When the start button B32b is pressed, the controller 11 executes the processing pertaining to the fax transmission job.

The destination display area R12b is a display area for displaying the destination of the fax selected/input via any of the "external address book" button B38b, "history information" button, "call by search number" button, or a direct input in a fax number input area R14 provided in the center of the normal setting screen W40.

FIG. 12A is a configuration example of a display screen W50 that displays the destination information acquired from the terminal device 30 in response to a press of the "external address book" button B38a of the simple setting screen W30 illustrated in FIG. 11A. The display screen W50 includes a destination area R16. This operation example corresponds to the processing at step S60 of FIG. 6.

When the destination information is acquired via the simple setting screen W30 pertaining to the fax transmission job, only the fax number that is the destination pertaining to the fax transmission job as the destination type is displayed in the destination area R16. FIG. 12A is an example in which the destination name and the fax number pertaining to the IDs "01" to "05" of the destination information illustrated in FIG. 4 are displayed.

FIG. 12B is a configuration example of a display screen W60 that displays the destination information acquired from the terminal device 30 in response to a press of the "external address book" button B38b of the normal setting screen W40 illustrated in FIG. 11B. The display screen W60 includes a destination area R18. This operation example corresponds to the process at Step S80 of FIG. 6.

When the destination information is acquired via the normal setting screen W40 pertaining to the fax transmission job, in addition to the fax number that is the destination pertaining to the fax transmission job as the destination type, display other destinations button B40 that accepts an input to display a destination pertaining to the other destination type is displayed in the destination area R18. By pressing the display other destinations button B40, the user can display a destination of other destination type, if other destination type exists in addition to the fax numbers. Similarly to FIG. 12A, FIG. 12B is an example in which the destination name and the fax number pertaining to the IDs "01" to "05" of the destination information illustrated in FIG. 4 are displayed.

FIG. 13 is a configuration example of a display screen W62 displayed by the controller 11 in response to a press of the display other destinations button B40 of the display screen W60 illustrated in FIG. 12. In a destination area R20 in the display screen W62, in addition to the configuration of the destination area R18, the mail address and the IFAX address pertaining to the image transmission job pertaining to the other destination type are displayed.

The destination displayed in the destination area R16 pertaining to the display screen W50, the destination area R18 pertaining to the display screen W60, or the destination area R20 of the display screen W62 can be selected by the user. The selected destination can be set as a transmission destination in the destination display area R12a of the simple setting screen W30, the destination display area R12b of the normal setting screen W40, or the like.

Figure 14A:
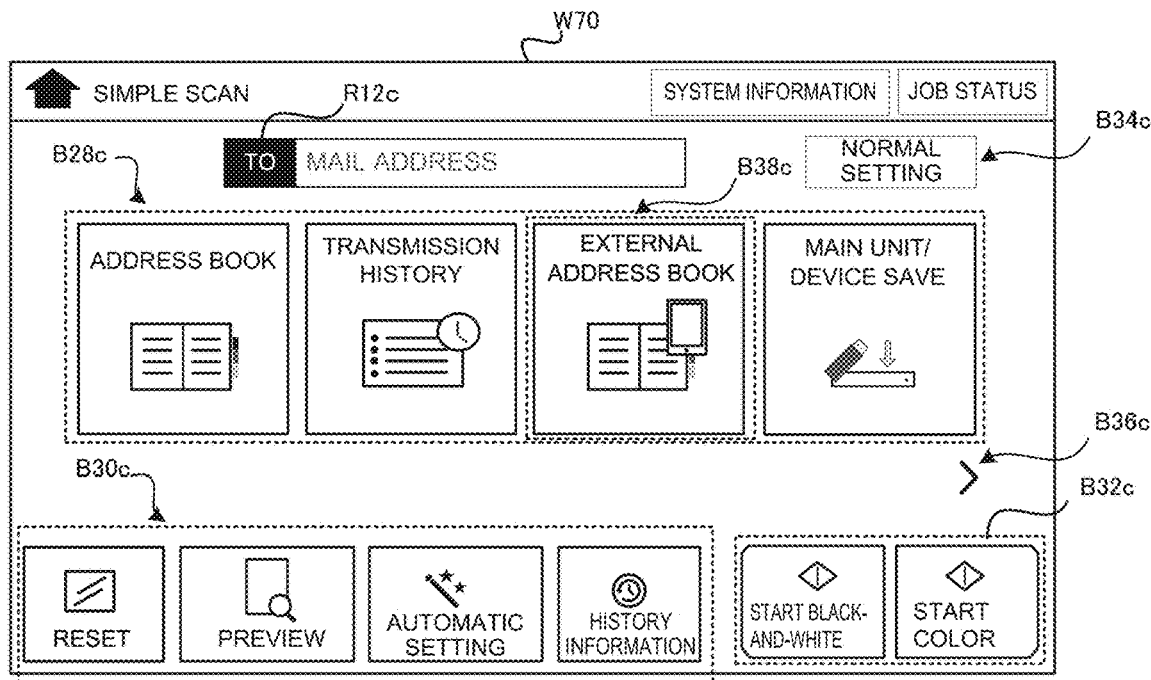
FIGS. 14A and 14B are a diagram illustrating an operation example according to the first embodiment.
Figure 14B:
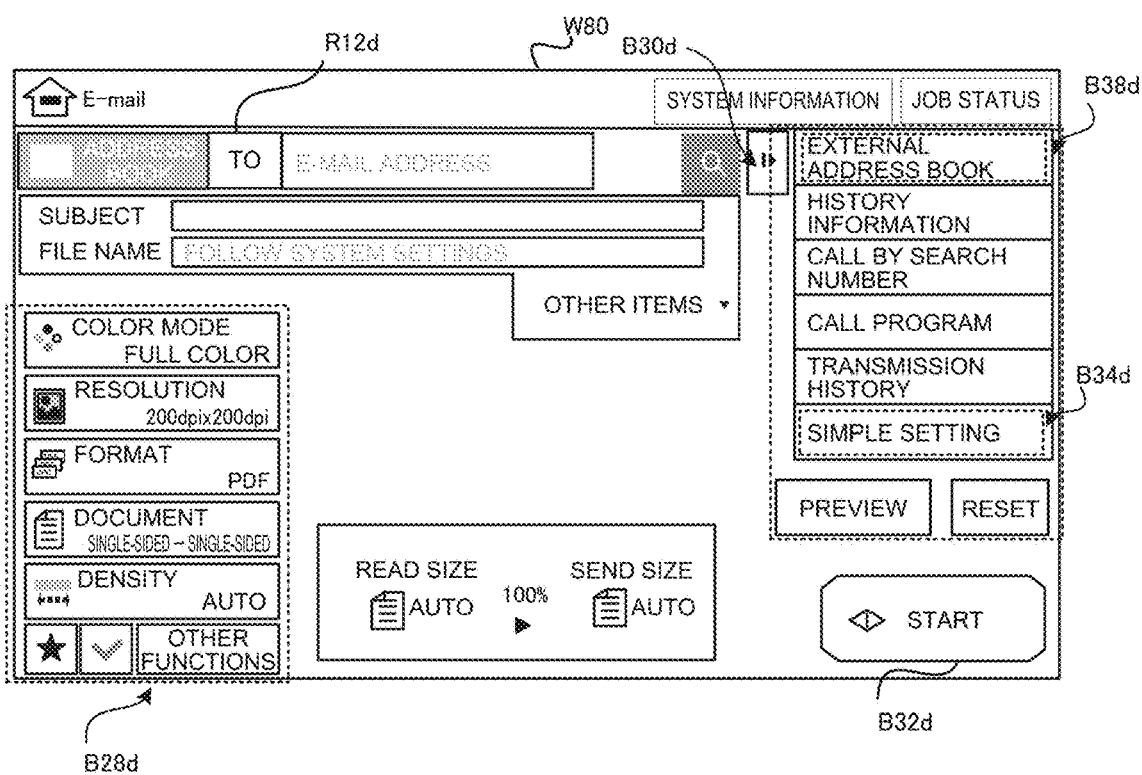

FIG. 14A is a configuration example of a simple setting screen W70 pertaining to the image transmission job (e-mail transmission job). FIG. 14B is a configuration example of a normal setting screen W80 pertaining to the image transmission job. The simple setting screen W70 can be displayed via the mode selection processing by the user via the history information display screen W10 of FIG. 9 and the home screen W20 of FIG. 10 and the normal setting screen W80.

The normal setting screen W80 can be displayed via, for example, the mode selection processing by the user via the history information display screen W10 of FIG. 9 and the home screen W20 of FIG. 10 and the simple setting screen W70. This operation example corresponds to the processing at step S20 of FIG. 6.

Compared to the normal setting screen W80, the simple setting screen W70 has a limited number of setting value items that can be set by the user, and the screen structure is simpler than that of the normal setting screen W80. The simple setting screen W70 includes setting value buttons B28c, operation control buttons B30c, a start button B32c, a normal setting button B34c, a display switching button B36c, and a destination display area R12c.

The setting value buttons B28c accept selection/input of setting values that can be set by the user and selection of various kinds of processing via the simple setting screen W70. For example, the user can press the address book button and set the destination of image transmission as a setting value from the displayed address book (not illustrated). FIG. 14A is an example in which four types of items, the "address book" button, the "transmission history" button, the "external address book" button B38c, and the "main unit/device save", are displayed as the setting value buttons. The other setting value buttons B28c can be displayed by pressing the display switching button B36c.

The user presses the "external address book" button B38c to acquire the destination information from the terminal device 30. In response to a press of the "external address book" button B38c, the controller 11 reads the destination information acquisition program 233 and acquires the destination information from the terminal device 30.

The operation control buttons B30c include, for example, a reset button, a preview button, an automatic setting, and a history information display button. For example, the reset button accepts a reset of the setting value selected and input via the setting value button B28c or the like. The preview button accepts an instruction to display a preview image prior to executing an image transmission job. The automatic setting button accepts the application of device settings configured in the system settings. The history information display button accepts an instruction to display the history information display screen W10 illustrated in FIG. 9.

The start button B32c accepts input of an instruction to execute an image transmission job. When the start button B32c is pressed, the controller 11 executes the processing pertaining to the image transmission job.

The normal setting button B34c accepts an instruction to switch display to the normal setting screen W80.

The destination display area R12c is a display area for displaying the destination of the image transmission selected/input via any of the "address book" button, "transmission history" button, or "external address book" button B38c of the setting value buttons B28c.

The normal setting screen W80 illustrated in FIG. 14B has a screen structure that allows all settings pertaining to the execution of an image transmission job. The normal setting screen W80 includes setting value buttons B28d, an operation control button B30d, a start button B32d, and a destination display area R12d.

The setting value buttons B28d accepts selection/input of setting values that can be set by the user and selection of various settings via the normal setting screen W80. The user can, for example, press the color mode button and select a desired setting value from items such as "full color", "black and white", "monochromatic color", and "automatic (color/black and white)" pertaining to color mode selection, thereby setting the setting value pertaining to the color mode. FIG. 14B is an example in which five types of setting value items of "color mode", "resolution", "format", "document", and "density" are provided as settable setting value items. For each setting value indicated on the surface of the setting value buttons B28d, the setting value of the selected history information is reflected and displayed (FIG. 14B is an example in which the setting value pertaining to the history information of the job ID "002" in FIG. 3 has been applied). The configuration of the setting value buttons B28d illustrated in FIG. 14B is merely an example, and is not limited to the description in FIG. 14B.

In addition to the above setting value items, the setting value buttons B28d are provided with an "other functions" button. By pressing the "other functions" button, the user can call up setting value items other than those displayed and select/input a setting value.

In addition to the preview and reset buttons, the operation control buttons B30d include, for example, an advanced function button such as an "external address book" button B38d, a "history information" button, and a "call by search number" button. The user presses the "external address book" button B38d to acquire the destination information from the terminal device 30. In response to a press of the "external address book" button B38d, the controller 11 reads the destination information acquisition program 233 and acquires the destination information from the terminal device 30.

Further, the operation control buttons B30d include a simple setting button B34d. The simple setting button B34d accepts an instruction to switch display to the simple setting screen W70.

The start button B32d accepts input of an instruction to execute an image transmission job. When the start button B32d is pressed, the controller 11 executes the processing pertaining to the image transmission job.

The destination display area R12d is a display area for displaying the destination of the e-mail transmission selected/input via any of the "external address book" button B38d, "history information" button, "call by search number" button, or a direct input.

FIG. 15A is a configuration example of a display screen W90 that displays the destination information acquired from the terminal device 30 in response to a press of the "external address book" button B38c of the simple setting screen W70 illustrated in FIG. 14A. The display screen W90 includes a destination area R22.

When the destination information is acquired via the simple setting screen W70 pertaining to the image transmission job, only the mail address or IFAX address that is the destination pertaining to the image transmission job as the destination type is displayed in the destination area R22. FIG. 15A is an example in which the destination name and the mail address or IFAX address pertaining to the IDs "01", "02", "03", and "05" of the destination information illustrated in FIG. 4 are displayed.

FIG. 15B is a configuration example of a display screen W100 that displays the destination information acquired from the terminal device 30 in response to a press of the "external address book" button B38d of the normal setting screen W80 illustrated in FIG. 14B. The display screen W100 includes a destination area R24.

When the destination information is acquired via the normal setting screen W80 pertaining to the image transmission job, in addition to the mail address or IFAX address that is the destination pertaining to the image transmission job as the destination type, display other destinations button B42 that accepts an input to display a destination pertaining to the other destination type is displayed in the destination area R24. By pressing the display other destinations button B42, the user can display a destination of other destination type, if other destination type exists in addition to the mail addresses and IFAX addresses. Similarly to FIG. 15A, FIG. 15B is an example in which the destination name and the fax number related to the IDs "01", "02", "03", and "05" of the destination information illustrated in FIG. 4 are displayed.

FIG. 16 is a configuration example of a display screen W102 displayed by the controller 11 in response to a press of the display other destinations button B42 of the display screen W100 illustrated in FIG. 15. In the destination area R26 in the display screen W102, in addition to the configuration of the destination area R24, the fax number pertaining to the other destination type is displayed.

The destination displayed in the destination area R22 pertaining to the display screen W90, the destination area R24 pertaining to the display screen W100, or the destination area R26 pertaining to the display screen W102 can be selected by the user. The selected destination can be set as a transmission destination in the destination display area R12c of the simple setting screen W70, the destination display area R12d of the normal setting screen W80, or the like.

As described above, according to the first embodiment, by restricting the display of acquired destination information in accordance with the operation mode of the transmission job when making a request to acquire the destination information, the burden on the user in selecting destination information can be reduced and more convenient image processing apparatus or the like can be provided.

2 Second Embodiment

In the first embodiment, the display control of destination information is performed in response to a request to acquire the destination information via the normal setting screen pertaining to the normal mode or the simple setting screen pertaining to the simple mode. In a second embodiment, the display control of destination information is performed in response to a request to acquire the destination information via the home screen that is a form of screen mode (basic mode).

2.1 Functional Configuration

The functional configurations of a multifunction peripheral and a terminal device according to the second embodiment may be the same as those of the multifunction peripheral 10 and the terminal device 30 according to the first embodiment. Therefore, the description of the functional configurations according to the second embodiment is omitted, and the same signs as those of the first embodiment are used for the description.

2.2 Flow of Processing

A flow of processing according to the second embodiment will be described using the flowchart in FIG. 17. The parts that are the same as the processing described with reference to the flowchart in FIG. 6 according to the first embodiment may be denoted by the same step number and its description may be omitted.

The controller 11 reads the display processing program 235, for example, when the power is turned on, when in the standby mode, or when restored from the sleep mode, thereby displaying the home screen W20 illustrated in FIG. 10 on the display 13 (step S90).

When the "external address book button" B24 provided on the home screen W20 is pressed by the user, the controller 11 reads the destination information acquisition program 233. Then, the controller 11 requests the terminal device 30 to output the destination information. When the destination information is output from the terminal device 30, the controller 11 acquires the destination information (step S30).

When acquiring the destination information from the terminal device 30, the controller 11 reads the destination determination program 234, thereby determining the destination type and classifying the destination (step S40).

Next, the controller 11 determines the destination type to be displayed on the basis of the number of registered destinations classified (step S100). Specifically, the controller 11 determines the destination type having the largest number of registered destinations in the terminal device 30 as the destination type to be displayed to the user.

The controller 11 displays the destination type to be displayed determined in step S100 on the display 13 (step S110).

Then, the controller 11 determines whether the destination type displayed on the display 13 has been selected by the user (step S120).

If the destination type displayed on the display 13 has been selected by the user, the controller 11 displays the destination pertaining to the destination type on the display 13 (if Yes in step S120, then step S130).

The controller 11 accepts a selection of the destination by the user (step S140). Then, the controller 11 executes a new job using the destination selected by the user and terminates the processing (step S70).

If the destination type displayed on the display 13 has not been selected by the user, the controller 11 displays the next destination type on the display 13 (if No in step S120, then step S150). In this case, the controller 11 determines the destination type having the largest number of registered destinations as the next destination type among the other destination types excluding the destination type determined in step S100, and displays the destination type on the display 13.

Then, the controller 11 determines whether the destination information displayed on the display 13 has been selected by the user (step S160).

If the destination type displayed on the display 13 has been selected by the user, the controller 11 displays the destination pertaining to the destination type on the display 13 (if Yes in step S160, then step S130).

The controller 11 accepts a selection of the destination by the user (step S140). Then, the controller 11 executes a new job using the destination selected by the user and terminates the processing (step S70).

On the other hand, if the destination type displayed on the display 13 has not been selected by the user, the controller 11 repeats the processing according to step S150 (if No in step S160, then step S150).

2.3 Operation Example

Next, an operation example according to the second embodiment will be described. FIG. 18A is an operation example corresponding to the display processing of the destination type in step S110 of FIG. 17, and is a configuration example of a destination type display screen W110 displayed on the display 13 by the controller 11. Further, FIG. 18B is an operation example corresponding to the display processing of the next destination type in step S150 of FIG. 17, and is a configuration example of a next destination type display screen W120 displayed on the display 13 by the controller 11. FIG. 18 indicates an example of operation when the fax transmission job is determined as the destination type to be displayed in the processing for determining the destination type to be displayed according to step S100 of FIG. 17, and the image transmission job is determined as the next destination type after the fax transmission job.

The destination type display screen W110 includes a destination type display area R28. The destination type display area R28 includes a destination type selection inquiry screen M10, a "Yes" button B44, and a "No" button B46.

Figure 17:
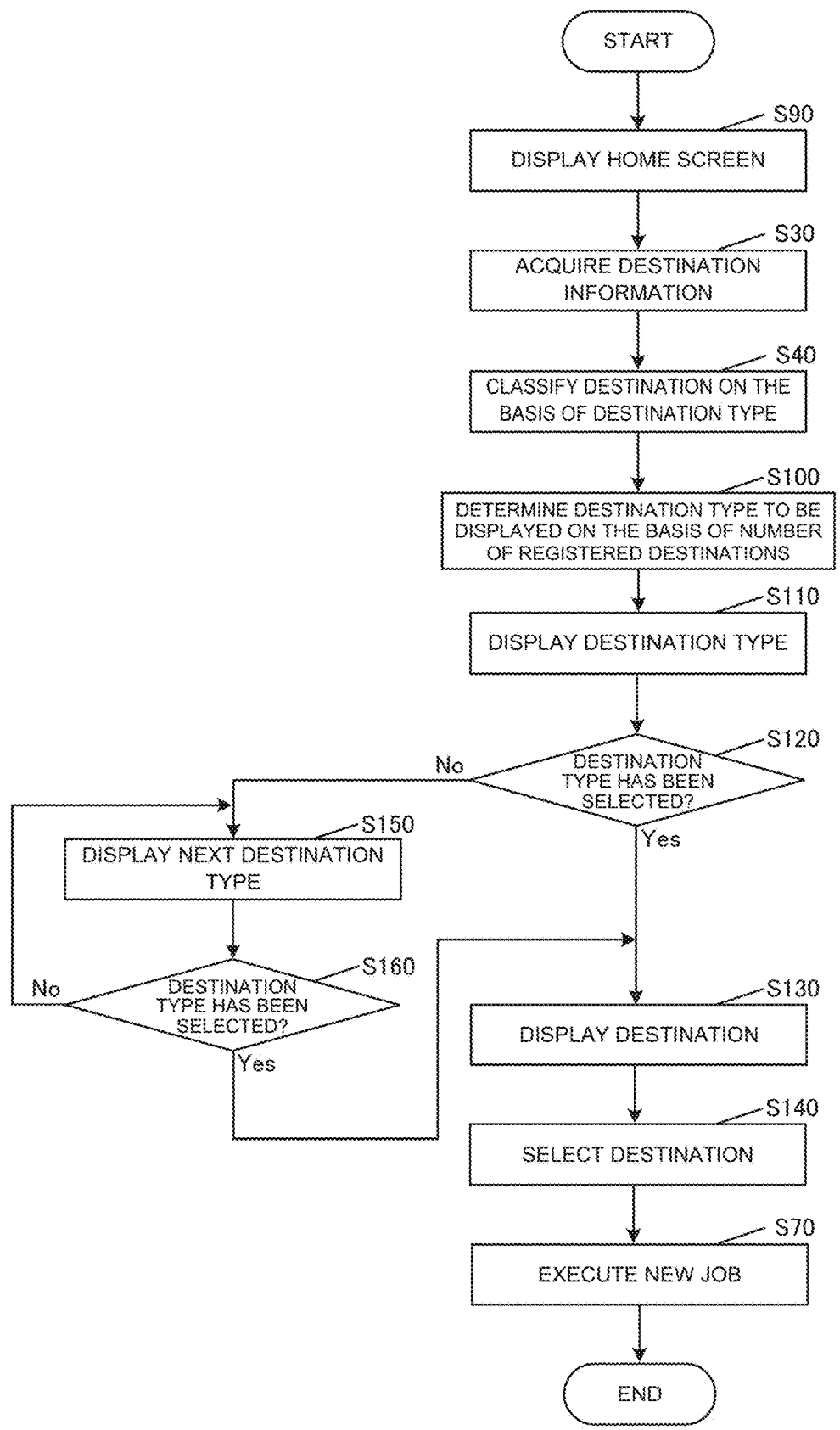
FIG. 17 is a flowchart illustrating an operation example according to a second embodiment.
Figure 18A:
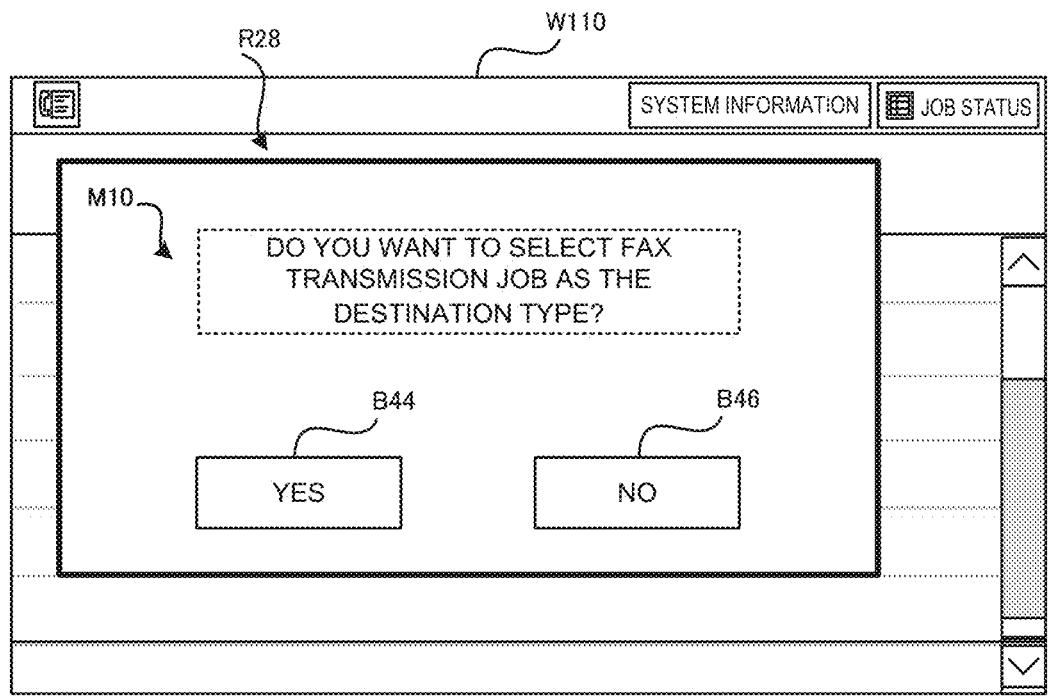
FIGS. 18A and 18B are a diagram illustrating an operation example according to the second embodiment.
Figure 18B:
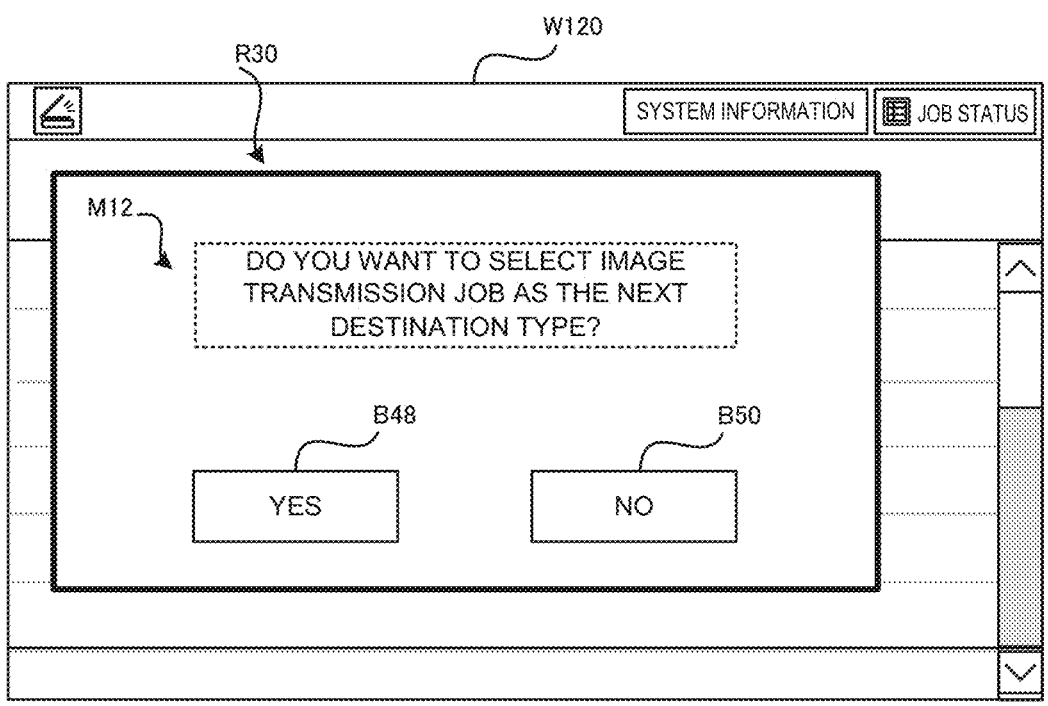

The destination type selection inquiry screen M10 is a screen that asks the user whether to select a destination type determined on the basis of the number of registered destinations in step S120 of FIG. 17.

The "Yes" button B44 is a button that accepts pressing when the user selects the destination type ("fax transmission job" in this operation example) displayed on the destination type selection inquiry screen M10. In response to a press of the "Yes" button B44, the controller 11 displays, on the display 13, the display screen W50 or the display screen W60 having the fax numbers illustrated in FIG. 12A or 12B as the destinations.

The "No" button B46 is a button that accepts pressing when the user does not select the destination type displayed on the destination type selection inquiry screen M10. In response to a press of the "No" button B46, the controller 11 displays the next destination type display screen W120 on the display 13.

The next destination type display screen W120 includes a next destination type display area R30. The next destination type display area R30 includes a next destination type selection inquiry screen M12, a "Yes" button B48, and a "No" button B50.

The next destination type selection inquiry screen M12 is a screen that asks the user whether to select a destination type having the largest number of registered destinations as the next destination type among the other destination types excluding the destination type determined in step S100.

The "Yes" button B48 is a button that accepts pressing when the user selects the destination type ("image transmission job" in this operation example) displayed on the next destination type selection inquiry screen M12. In response to a press of the "Yes" button B48, the controller 11 displays, on the display 13, the display screen W90 or the display screen W100 having the mail addresses or IFAX addresses illustrated in FIG. 15A or 15B as the destinations.

The "No" button B50 is a button that accepts pressing when the user does not select the next destination type displayed on the next destination type selection inquiry screen M12. In response to a press of the "No" button B50, the controller 11 displays, on the display 13, the destination type having the largest number of registered destinations next to the next destination type.

As described above, according to the second embodiment, when a request to acquire destination information is made via the home screen as the basic mode, the destination type pertaining to a large number of registered destinations in the terminal device 30 can be displayed in order. Therefore, it is possible to reduce the burden on the user in selecting destination information and provide a more convenient image processing apparatus or the like.

3 Third Embodiment

In the second embodiment, the destination type is displayed to the user in the order of the number of registered destinations in the terminal device 30. In a third embodiment, it is possible to check the number of registered destinations as the number of acquisitions for each destination type.

3.1 Functional Configuration

The functional configurations of a multifunction peripheral and a terminal device according to the third embodiment may be the same as those of the multifunction peripheral 10 and the terminal device 30 according to the first embodiment. Therefore, the description of the functional configurations according to the third embodiment is omitted, and the same sign as that of the first embodiment is used for the description.

3.2 Flow of Processing

Figure 19:
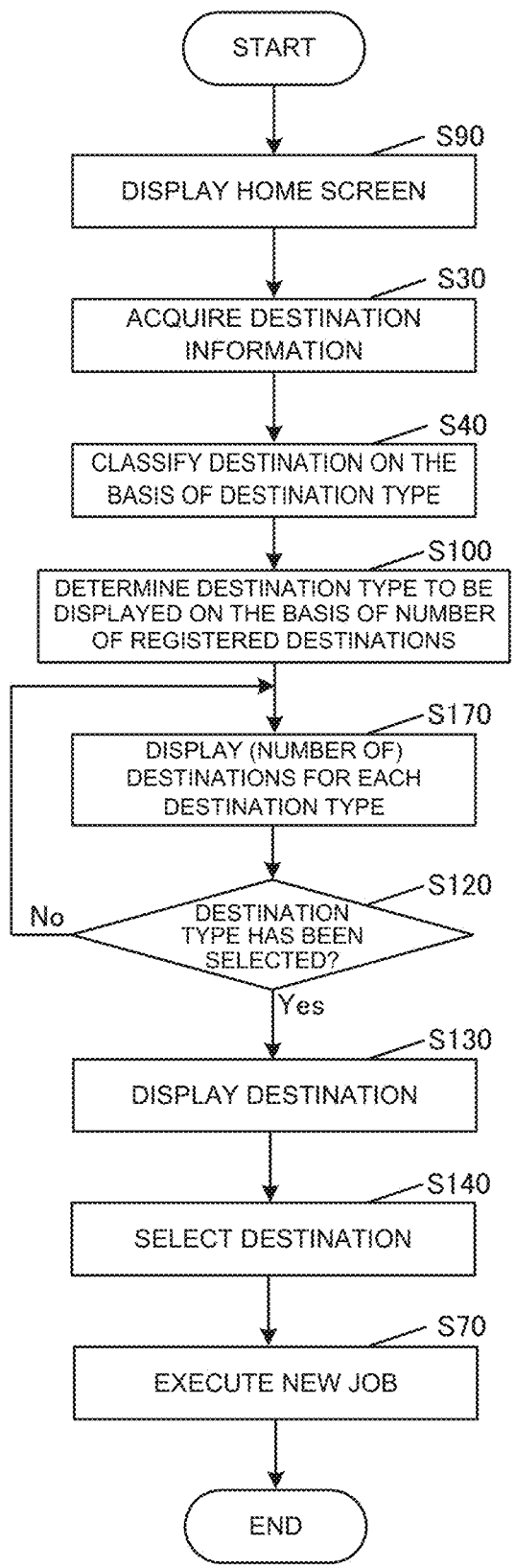
FIG. 19 is a flowchart illustrating an operation example according to the second embodiment.

In the flow of the processing according to the third embodiment, the processing of step S110 described with reference to the flowchart in FIG. 17 of the second embodiment is replaced with the processing of step S170 illustrated in FIG. 19. This section describes the processing which differs from that of the flowchart in FIG. 17.

In step S100, the controller 11 determines the destination type to be displayed on the basis of the number of registered destinations classified, and then displays the number of destinations for each destination type (step S170).

Then, the controller 11 determines whether the destination type displayed on the display 13 has been selected by the user (step S120).

If the destination type displayed on the display 13 has been selected by the user, the controller 11 displays the destination pertaining to the destination type on the display 13 (if Yes in step S120, then step S130). On the other hand, if the destination type displayed on the display 13 has not been selected by the user, the controller 11 returns the processing to step S170 (if No in step S120, then step S170).

3.3 Operation Example

Figure 20:
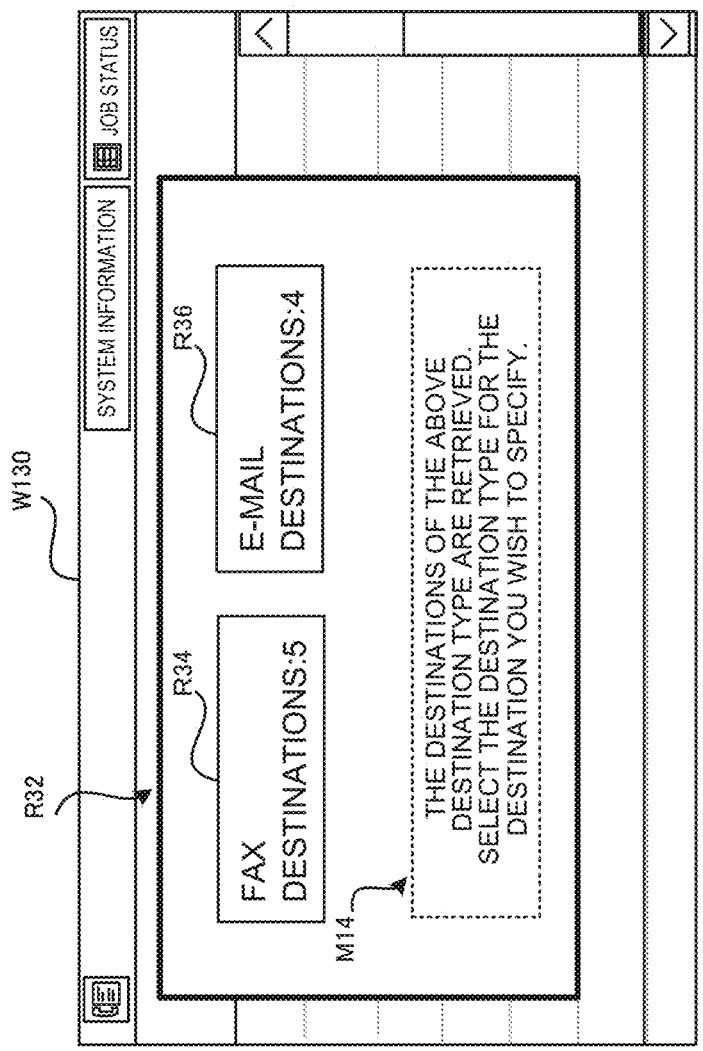
FIG. 20 is a diagram illustrating an operation example according to a third embodiment.

Next, an operation example according to the third embodiment will be described. FIG. 20 is an operation example corresponding to the display processing of the destination count in step S170 of FIG. 19, and is a configuration example of a destination count display screen W130 displayed on the display 13 by the controller 11.

The destination count display screen W130 includes a destination count display area R32. The destination count display area R32 includes each type destination count display areas R34 and R36 as a selection screen, and a destination type selection inquiry screen M14.

The each type destination count display areas R34 and R36 are areas that display the number of registered destinations for each destination type. In the example in FIG. 20, the each type destination count display area R34 displays the number of registered destinations pertaining to the fax transmission job as the destination type. Similarly, the each type destination count display area R36 displays the number of registered destinations pertaining to the image transmission job as the destination type.

The each type destination count display areas R34 and R36 are configured so as to be selected (pressed) by the user. When either each type destination count display area R34 or R36 is selected by the user, the controller 11 displays the destination pertaining to that destination type on the display 13.

The destination type selection inquiry screen M14 is a screen for inquiring the user to select a destination type on the basis of the number of registered destinations displayed in the each type destination count display areas R34 and R36.

As described above, according to the third embodiment, when a request to acquire destination information is made via the home screen, it is possible to check the number of registered destinations for each destination type. Therefore, it is possible to reduce the burden on the user in selecting destination information and provide a more convenient image processing apparatus or the like.

The present disclosure is not limited to the above-described embodiments, and various modifications may be made. That is, the technical scope of the present disclosure also includes embodiments that may be obtained by combining technical measures that are modified as appropriate without departing from the gist of the present disclosure.

Further, although some of the above embodiments are described separately for convenience of explanation, it is needless to say that they may be combined and implemented within a technically allowable range.

Further, the program operated on each device in the embodiments is a program that controls the CPU or the like (program that causes the computer to function) so as to implement the function according to the above embodiments. Moreover, the information handled by these devices is temporarily stored in a temporary storage device (for example, a RAM) when being processed, and then stored in various storage devices such as a ROM and an HDD, where the information is read, corrected, and written by the CPU as needed.

Here, as the recording medium for storing the program, a semiconductor medium (e.g., a ROM or a non-volatile memory card), an optical recording medium/magneto-optical recording medium (e.g., a digital versatile disc (DVD), a magneto optical disc (MO), a mini disc (MD), a compact disc (CD), or a Blu-ray (registered trademark) Disk (BD)), a magnetic recording medium (e.g., a magnetic tape or a flexible disk), or the like may be used. Further, not only are the functions of the foregoing embodiments implemented through execution of the loaded program, but the functions of the present disclosure may also be implemented through processing performed in cooperation with an operating system or other application programs or the like on the basis of instructions of the program.

Furthermore, when the program is to be distributed to the market, the program may be stored in a portable recording medium for distribution or transferred to a server computer connected via a network such as the Internet. In this case, a storage device of the server computer is also included in the present disclosure as a matter of course.

What is claimed is:

1. An image processing apparatus comprising:
an acquirer that acquires destination information from an external device;
a job executor that executes a transmission job using the acquired destination information; and
a controller,
wherein the controller controls display of the destination information in accordance with a screen mode of the transmission job that has accepted the request to acquire the destination information,
wherein the screen mode includes a normal mode for accepting execution of the transmission job via a normal setting screen and a simple mode for accepting execution of the transmission job via a simple setting screen which is simpler than the normal setting screen, and
wherein when the screen mode that has accepted the request to acquire the destination information is the normal mode, the controller controls in such a manner that, in addition to the destination information according to a destination type, the destination information of a destination type other than the destination type is displayed.

2. The image processing apparatus according to claim 1, wherein when the screen mode that has accepted the request to acquire the destination information is the simple mode, the controller displays the destination information according to a destination type.

3. The image processing apparatus according to claim 1, further comprising a display that displays a basic screen that accepts the request to acquire the destination information,
wherein when accepting the request to acquire the destination information via the basic screen, the controller classifies the destination information acquired from the external device on a basis of a destination type, and determines a destination type to be displayed on the display on a basis of a number of registered destinations classified.

4. The image processing apparatus according to claim 3, wherein the controller further displays, on the display, the number of registered destinations classified and the destination information acquired from the external device.

5. The image processing apparatus according to claim 3, wherein the controller further displays, on the display, a selection screen for accepting a selection of the destination type.

6. The image processing apparatus according to claim 1, wherein the transmission job includes fax, e-mail, or IFAX.

7. A control method comprising:
acquiring destination information from an external device;
executing a transmission job using the acquired destination information; and
controlling,
wherein the controlling controls display of the destination information in accordance with a screen mode of the transmission job that has accepted the request to acquire the destination information,
wherein the screen mode includes a normal mode for accepting execution of the transmission job via a normal setting screen and a simple mode for accepting execution of the transmission job via a simple setting screen which is simpler than the normal setting screen, and
wherein when the screen mode that has accepted the request to acquire the destination information is the normal mode, the controller controls in such a manner that, in addition to the destination information according to a destination type, the destination information of a destination type other than the destination type is displayed.

* * * * *